United States Patent
Nakano

(10) Patent No.: US 10,920,700 B2
(45) Date of Patent: Feb. 16, 2021

(54) SENSOR CONTROL APPARATUS

(71) Applicant: NGK Spark Plug Co., LTD., Nagoya (JP)

(72) Inventor: Yoshihiro Nakano, Komaki (JP)

(73) Assignee: NGK Spark Plug Co., LTD., Nagoya (JP)

(*) Notice: Subject to any disclaimer, the term of this patent is extended or adjusted under 35 U.S.C. 154(b) by 228 days.

(21) Appl. No.: 16/141,480

(22) Filed: Sep. 25, 2018

(65) Prior Publication Data
US 2019/0107071 A1    Apr. 11, 2019

(30) Foreign Application Priority Data

Oct. 11, 2017  (JP) ................... 2017-197825
Sep. 11, 2018  (JP) ................... 2018-170105

(51) Int. Cl.
| | | |
|---|---|---|
| *G01N 27/407* | (2006.01) | |
| *F02D 41/14* | (2006.01) | |
| *G01N 27/409* | (2006.01) | |
| *G01N 27/406* | (2006.01) | |
| *G01N 27/417* | (2006.01) | |
| *F02D 41/04* | (2006.01) | |

(52) U.S. Cl.
CPC ..... *F02D 41/1454* (2013.01); *F02D 41/1495* (2013.01); *G01N 27/409* (2013.01); *G01N 27/4065* (2013.01); *G01N 27/4175* (2013.01); *F02D 41/042* (2013.01); *G01N 27/407* (2013.01)

(58) Field of Classification Search
CPC . G01N 27/4065; G01N 27/407; G01N 27/409
See application file for complete search history.

(56) References Cited

U.S. PATENT DOCUMENTS 4,753,203 A  *  6/1988  Yamada ............... G01N 27/417
                                                73/23.32
2012/0131909 A1    5/2012  Maeda

FOREIGN PATENT DOCUMENTS

JP     2012-117832 A     6/2012
JP     2014-48279 A      3/2014

* cited by examiner

*Primary Examiner* — Alexander S Noguerola
(74) *Attorney, Agent, or Firm* — Leason Ellis LLP

(57) ABSTRACT

A sensor control apparatus supplies a constant current to an oxygen concentration detection cell when it judges that oxygen concentration is greater than 15% (the concentration of oxygen contained in a measurement chamber is high). The sensor control apparatus detects a first difference voltage generated in the oxygen concentration detection cell as a result of the flow of the constant current to the oxygen concentration detection cell after a predetermined first detection time following the supply of the constant current. The sensor control apparatus detects a second difference voltage generated in the oxygen concentration detection cell as a result of the flow of the constant current to the oxygen concentration detection cell after a second detection time, which is previously set to be longer than the first detection time, following the supply of the constant current.

10 Claims, 12 Drawing Sheets

SENSOR CONTROL APPARATUS

This application claims the benefit of Japanese Patent Applications No. 2017-197825, filed Oct. 11, 2017 and No. 2018-170105, filed Sep. 11, 2018, which are incorporated herein by reference in their entirety.

FIELD OF THE INVENTION

The present disclosure relates to a sensor control apparatus for controlling a gas sensor.

BACKGROUND OF THE INVENTION

Conventionally, there has been known a sensor control apparatus for controlling a gas sensor which includes an oxygen concentration detection cell including a solid electrolyte body having a pair of first electrodes, and a pump cell including a solid electrolyte body having a pair of second electrodes. Such a sensor control apparatus controls the pump current flowing between the pair of second electrodes of the pump cell such that the voltage produced between the pair of first electrodes of the oxygen concentration detection cell becomes equal to a control target voltage.

Japanese Unexamined Publication No. 2014-48279 describes a sensor control apparatus which detects deterioration of the oxygen concentration detection cell by using a difference between a first element resistance in a state in which the pump current is controlled with the control target voltage being set to a first target voltage and a second element resistance in a state in which the pump current is controlled with the control target voltage being set to a second target voltage.

Problem to be Solved by the Invention

However, the sensor control apparatus described in Japanese Unexamined Publication No. 2014-48279 has a problem in that deterioration detection requires time, because the concentration of oxygen within a measurement chamber must be changed, by switching the control target voltage, so as to detect deterioration of the oxygen concentration detection cell.

An object of the present disclosure is to accurately detect deterioration of a gas sensor within a short period of time.

SUMMARY OF THE INVENTION

Means for Solving the Problem

One mode of the present disclosure is a sensor control apparatus for controlling a gas sensor. The gas sensor which is connected to the sensor control apparatus includes a measurement chamber into which gas under measurement (target gas) is introduced, an oxygen concentration detection cell, and a pump cell. The oxygen concentration detection cell has a first solid electrolyte body and a pair of first electrodes which are formed on the first solid electrolyte body, one of which is disposed to face the measurement chamber, and the other of which is disposed in a reference gas chamber set to a reference gas atmosphere. The oxygen concentration detection cell generates a voltage corresponding to a difference in an oxygen partial pressure between the measurement chamber and the reference gas chamber. The pump cell has a second solid electrolyte body and a pair of second electrodes which are formed on the second solid electrolyte body and one of which is disposed to face the measurement chamber. The pump cell pumps out oxygen contained in the gas under measurement introduced into the measurement chamber or pumps oxygen into the measurement chamber in accordance with pump current flowing between the pair of second electrodes. The sensor control apparatus of the present disclosure is configured to control the supply of the pump current flowing to the pump cell such that the voltage produced in the oxygen concentration detection cell becomes equal to a first target voltage set as a control target voltage.

The sensor control apparatus of the present disclosure includes a condition judgment section, an energization-for-detection section, a first detection section, and a second detection section.

The condition judgment section is configured to judge whether or not a deterioration detection condition is satisfied, said deterioration detection condition being previously set and indicating that the concentration of oxygen contained in the measurement chamber is high.

The energization-for-detection section is configured to supply deterioration detection current having a previously set constant current value to the oxygen concentration detection cell when the condition judgment section judges that the deterioration detection condition is satisfied.

The first detection section is configured to detect a first cell voltage which is generated in the oxygen concentration detection cell as a result of the deterioration detection current flowing to the oxygen concentration detection cell after a predetermined first detection time following the supply of the deterioration detection current by the energization-for-detection section to the oxygen concentration detection cell.

The second detection section is configured to detect a second cell voltage which is generated in the oxygen concentration detection cell as a result of the deterioration detection current flowing to the oxygen concentration detection cell after a predetermined second detection time, which is longer than the first detection time, following the supply of the deterioration detection current by the energization-for-detection section to the oxygen concentration detection cell.

The sensor control apparatus of the present disclosure configured as described above detects the first cell voltage after the first detection time following the supply of the deterioration detection current to the oxygen concentration detection cell and detects the second cell voltage after the second detection time following the supply of the deterioration detection current to the oxygen concentration detection cell. Therefore, the sensor control apparatus of the present disclosure can obtain information necessary for judging whether or not the gas sensor has deteriorated (namely, the first cell voltage and the second cell voltage) within a short period of time. Thus, the sensor control apparatus can detect deterioration of the gas sensor within a short period of time.

Also, the sensor control apparatus of the present disclosure detects the first cell voltage and the second cell voltage upon satisfaction of the previously set deterioration detection condition indicating that the concentration of oxygen contained in the measurement chamber is high. As a result, the sensor control apparatus of the present disclosure can enhance the accuracy in detecting deterioration of the gas sensor.

Also, in the one mode of the present disclosure, specifically, the deterioration detection condition may be that the concentration of oxygen contained in the measurement chamber is greater than a previously set detection start determination value.

Also, in the one mode of the present disclosure, specifically, the sensor control apparatus may include a pump cell stoppage section, and the deterioration detection condition may be that a previously set detection start time elapses after the engine stops. The pump cell stoppage section is configured to stop the pumping out or pumping in of oxygen by the pump cell when the engine of a vehicle, on which the sensor control apparatus is mounted, stops.

Also, in the one mode of the present disclosure, specifically, the sensor control apparatus may include a pump cell stoppage section, and the deterioration detection condition may be that the engine of the vehicle on which the sensor control apparatus is mounted stops and the voltage generated in the oxygen concentration detection cell is equal to or lower than a previously set detection start voltage.

Also, in the one mode of the present disclosure, specifically, the sensor control apparatus may include a target voltage setting section, and the deterioration detection condition may be that the control target voltage is switched from the first target voltage to a second target voltage by the target voltage setting section. The target voltage setting section is configured to set the control target voltage to the first target voltage during a period during which the concentration of a particular gas component is detected by the gas sensor, and to set the control target voltage to the second target voltage whose voltage value is different from that of the first target voltage during a period during which deterioration of the gas sensor is detected. The second target voltage has a voltage value for controlling the supply of the pump current such that the concentration of oxygen contained in the measurement chamber becomes higher than that in the case where the supply of the pump current is controlled such that the voltage generated in the oxygen concentration detection cell becomes equal to the first target voltage.

Notably, in this mode, the deterioration detection condition may be that the control target voltage is switched from the first target voltage to the second target voltage by the target voltage setting section and a previously set stabilization time elapses after the control target voltage has been set to the second voltage. In this case, the accuracy in detecting deterioration of the gas sensor can be enhanced further.

Also, in the one mode of the present disclosure, the sensor control apparatus may comprise a deterioration judgment section configured to judge whether or not the gas sensor has deteriorated on the basis of a deterioration determination voltage obtained by subtracting the first cell voltage from the second cell voltage. In this case, the sensor control apparatus of the present disclosure can accurately detect deterioration of the gas sensor.

Also, in the one mode of the present disclosure, the sensor control apparatus may comprise a pump current correction section configured to correct the current value of the pump current on the basis of the first cell voltage and the second cell voltage. In this case, the sensor control apparatus of the present disclosure can prevent a decrease in oxygen concentration detection accuracy even when the gas sensor has deteriorated.

Also, in the one mode of the present disclosure, the sensor control apparatus may comprise an impedance detection energization section, a third detection section, a heater control section, and a control correction section.

The impedance detection energization section is configured to supply impedance detection current having a previously set constant current value to the oxygen concentration detection cell. The third detection section is configured to detect a third cell voltage generated in the oxygen concentration detection cell as a result of the impedance detection current flowing to the oxygen concentration detection cell after a predetermined third detection time following the supply of the impedance detection current by the impedance detection energization section to the oxygen concentration detection cell.

The heater control section is configured to control energization of a heater for heating the oxygen concentration detection cell and the pump cell through use of the third cell voltage detected by the third detection section. The control correction section is configured to correct the control performed by the heater control section, on the basis of the first cell voltage and the second cell voltage.

In this case, the sensor control apparatus of the present disclosure can prevent a decrease in the accuracy of the temperature control of the gas sensor by the heater even when the third cell voltage changes due to the deterioration of the gas sensor.

Also, in the one mode of the present disclosure, specifically, the control correction section may correct the control performed by the heater control section by correcting a target value of a controlled variable for controlling the heater based on the first cell voltage and the second cell voltage.

BRIEF DESCRIPTION OF THE DRAWINGS

These and other features and advantages of the present invention will become more readily appreciated when considered in connection with the following detailed description and appended drawings, wherein like designations denote like elements in the various views, and wherein.

DETAILED DESCRIPTION OF THE INVENTION

First Embodiment

A first embodiment of the present disclosure will now be described with reference to the drawings.

Figure 1:
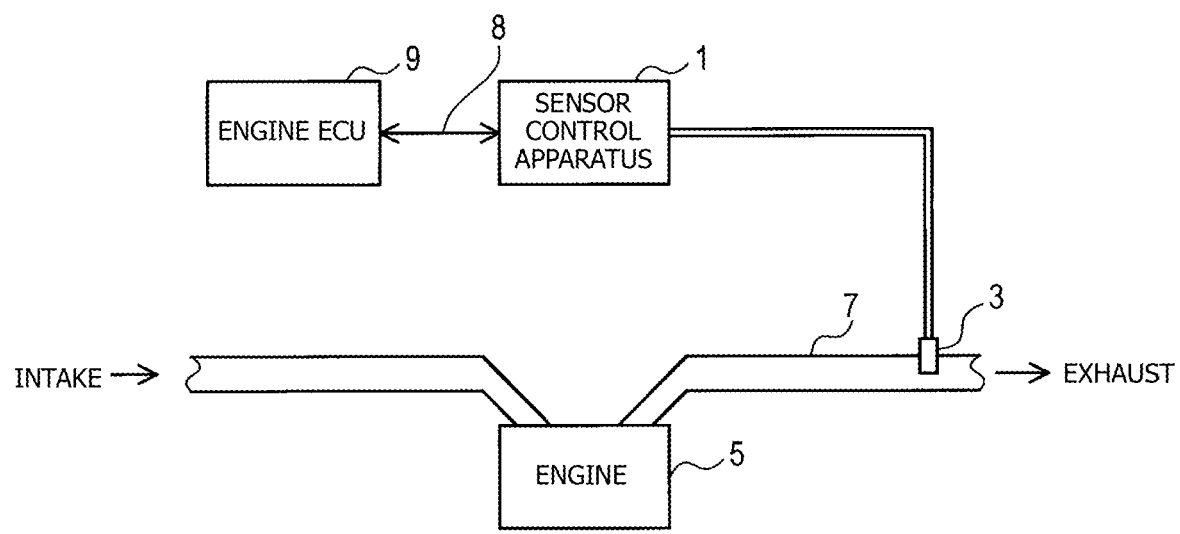
FIG. 1 is a diagram showing a schematic configuration of a system which includes a sensor control apparatus 1 as a constituent element.

A sensor control apparatus 1 of the present embodiment is mounted on a vehicle, and, as shown in FIG. 1, controls a gas sensor 3.

The sensor control apparatus 1 is configured such that, via a communication line 8, data can be transmitted to and received from an electronic control apparatus 9 for controlling an engine 5. Hereinafter, the electronic control apparatus 9 will be referred to as the "engine ECU 9." ECU is an abbreviation of Electronic Control Unit.

The gas sensor 3 is attached to an exhaust pipe 7 of the engine 5 and detects the concentration of oxygen in exhaust gas in a wide range. The gas sensor 3 is also called "linear lambda sensor."

Figure 2:
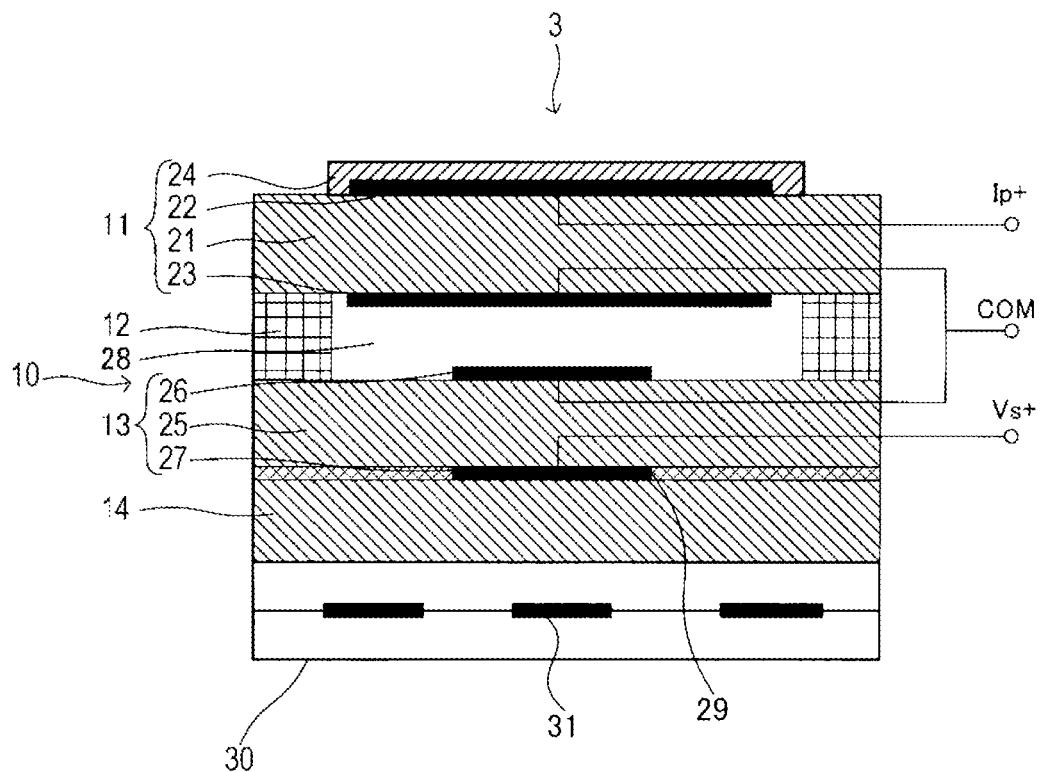
FIG. 2 is a view showing a schematic structure of a gas sensor 3.

As shown in FIG. 2, the gas sensor 3 has a sensor element 10, a heater 30, a terminal Ip+, a terminal COM, and a terminal Vs+.

The sensor element 10 includes a pump cell 11, porous diffusion layers 12, an oxygen concentration detection cell 13, and a reinforcing plate 14.

The pump cell 11 includes an oxygen-ion-conductive solid electrolyte body 21 formed of partially stabilized zirconia and having a plate-like shape, pump electrodes 22 and 23 provided on the front and back surfaces of the oxygen-ion-conductive solid electrolyte body 21 and formed mainly of platinum, and a porous protective layer 24 covering the pump electrode 22. The porous protective layer 24 covering the pump electrode 22 protects the pump electrode 22 from poisoning substances or the like. The pump electrode 22 is connected to the terminal Ip+, and the pump electrode 23 is connected to the terminal COM.

The oxygen concentration detection cell 13 includes an oxygen-ion-conductive solid electrolyte body 25 formed of partially stabilized zirconia and having a plate-like shape, and detection electrodes 26 and 27 provided on the front and back surfaces of the oxygen-ion-conductive solid electrolyte body 25 and formed mainly of platinum. The detection electrode 26 is connected to the terminal COM, and the detection electrode 27 is connected to the terminal Vs+.

An unillustrated insulating layer formed mainly of an insulating material (e.g., alumina) is provided between the pump cell 11 and the oxygen concentration detection cell 13 so as to electrically insulate the pump cell 11 and the oxygen concentration detection cell 13 from each other. The porous diffusion layers 12 are provided in portions of the insulating layer. Notably, the porous diffusion layers 12 are formed mainly of an insulating material (e.g., alumina) to be porous for limiting the diffusion rate of a gas under measurement introduced into the sensor element 10.

A hollow measurement chamber 28 surrounded by the porous diffusion layers 12 and the unillustrated insulating layer is formed between the pump cell 11 and the oxygen concentration detection cell 13. Namely, the measurement chamber 28 communicates with a measurement gas atmosphere through the porous diffusion layers 12. The pump electrode 23 and the detection electrode 26 are disposed in the measurement chamber 28.

The reinforcing plate 14 is disposed on a surface of the oxygen concentration detection cell 13 on the side opposite a surface thereof facing the measurement chamber 28 such that the reinforcing plate 14 is in close contact with the former surface while sandwiching the detection electrode 27. As a result, the reinforcing plate 14 increases the overall strength of the sensor element 10. Notably, the reinforcing plate 14 has a size approximately the same as those of the solid electrolyte bodies 21 and 25 of the pump cell 11 and the oxygen concentration detection cell 13. The reinforcing plate 14 is made of a material containing ceramic as a main component and is formed into a plate-like shape.

In the sensor element 10 configured as described above, a constant small current Icp is caused to flow from the detection electrode 27 of the oxygen concentration detection cell 13 toward the detection electrode 26 so as to pump oxygen from the measurement chamber 28 toward the detection electrode 27. As a result, oxygen of an approximately constant concentration is accumulated in the reference gas chamber 29 formed around the detection electrode 27. The oxygen of an approximately constant concentration accumulated in the reference gas chamber 29 serves as a reference gas concentration (reference oxygen concentration) when the oxygen concentration in the gas under measurement is detected by the sensor element 10. Therefore, the detection electrode 27 is also called a self-generating reference electrode.

The heater 30 is formed to have a flat-plate-like shape, is stacked on the reinforcing plate 14, and is integrated with the pump cell 11, the oxygen concentration detection cell 13, and the reinforcing plate 14. The heater 30 is formed of a material whose main component is alumina, and includes a heater wire 31 formed of a material whose main component is platinum. The heater 30 is controlled by electric power supplied from a heater control circuit 42, which will be described later, such that the temperature of the sensor element 10 becomes an activation temperature (e.g., 550 to 900° C.).

Notably, when the sensor element 10 becomes active as a result of heating by the heater 30, the gas sensor 3 enters a gas detectable state.

In the sensor element 10, the exhaust gas from the internal combustion engine, which is the gas under measurement, diffuses into the measurement chamber 28 through the porous diffusion layers 12. The sensor element 10 has characteristics as follows. In a state in which the exhaust gas from the internal combustion engine is introduced into the measurement chamber 28 while the air-fuel ratio of an air-fuel mixture supplied to the internal combustion engine is maintained at the stoichiometric air-fuel ratio, an electromotive force of 450 mV is produced in the oxygen concentration detection cell 13 due to the difference in oxygen concentration between the measurement chamber 28 and the reference gas chamber 29. Namely, a potential difference of 450 mV is produced between the detection electrode 26 and the detection electrode 27.

Notably, the oxygen concentration detection cell 13 has characteristics that it generates voltage (electromotive force) corresponding to the difference in oxygen concentration between the detection electrode 26 and the detection electrode 27. The oxygen within the reference gas chamber 29 which the detection electrode 27 faces has an approximately constant concentration. Therefore, the oxygen concentration detection cell 13 generates, between the detection electrode 26 and the detection electrode 27, a voltage corresponding to the oxygen concentration within the measurement chamber 28.

Incidentally, when the air-fuel ratio of the air-fuel mixture supplied to the internal combustion engine changes, the concentration of oxygen contained in exhaust gas changes, whereby the concentration of oxygen contained in the measurement chamber 28 of the sensor element 10 changes. In view of this, the sensor control apparatus 1 controls the pump current Ip flowing to the pump cell 11 such that the potential difference between the detection electrode 26 and the detection electrode 27 is maintained at 450 mV. Namely, as a result of control of the pump current Ip such that the atmosphere within the measurement chamber 28 becomes the same as that in the case where the air-fuel ratio is the stoichiometric air-fuel ratio, pumping of oxygen is performed by the pump cell 11. Therefore, the sensor control apparatus 1 can compute the oxygen concentration in the exhaust gas on the basis of the flow state of the pump current Ip (for example, flow direction, current cumulative value, etc.).

The pump cell 11 is configured such that, in accordance with the flow direction of current flowing between the pump electrode 22 and the pump electrode 23, the pump cell 11 can selectively perform the pumping out of oxygen from the measurement chamber 28 and the pumping of oxygen into the measurement chamber 28. Also, the pump cell 11 is configured such that it can adjust the oxygen pumping rate in accordance with the magnitude of the current flowing between the pump electrode 22 and the pump electrode 23.

Figure 3:
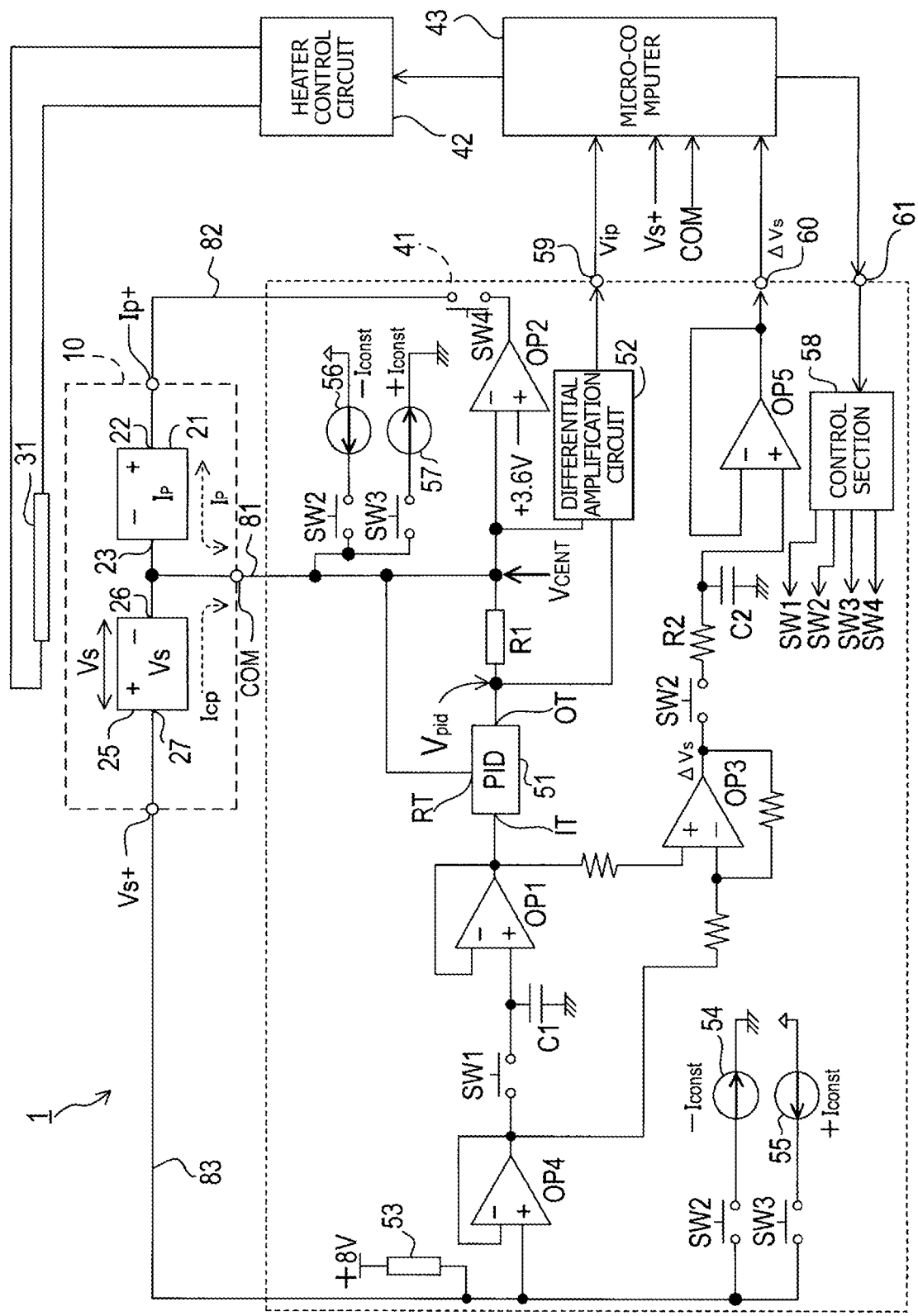
FIG. 3 is a diagram showing a schematic configuration of the sensor control apparatus 1.

As shown in FIG. 3, the sensor control apparatus 1 includes a sensor control circuit 41, a heater control circuit 42, and a microcomputer 43.

The sensor control circuit 41 is realized by an integrated circuit for a specific application (namely, ASIC). ASIC is an abbreviation of Application Specific IC.

Opposite ends of the heater wire 31 are connected to the heater control circuit 42. The heater control circuit 42 PWM-controls the voltage supplied to the opposite ends of the heater wire 31 on the basis of a PWM control signal input from the microcomputer 43, thereby causing the heater 30 to generate heat. PWM is an abbreviation of Pulse Width Modulation.

The microcomputer 43 includes a CPU, a ROM, a RAM, a flush memory, etc. The various functions of the microcomputer are realized by a program which is stored in a non-transitory tangible recording medium and executed by the CPU. In this example, the ROM corresponds to the non-transitory tangible recording medium storing the program. Also, a method corresponding to the program is performed as a result of execution of this program. Notably, some or all of the functions of the CPU may be realized by hardware; for example, by a single IC or a plurality of ICs.

The sensor control circuit 41 includes resistors R1 and R2, operational amplifiers OP1, OP2, OP3, OP4, and OP5, a switch SW1, three switches SW2, two switches SW3, a switch SW4, and capacitors C1 and C2. The sensor control circuit 41 further includes a PID control circuit 51, a differential amplification circuit 52, an Icp supply circuit 53, current sources 54, 55, 56, and 57, a control section 58, output terminals 59 and 60, and a reception port 61.

The terminal COM of the gas sensor 3 is connected to a Vcent point through a connection wire 81. The terminal Ip+ of the gas sensor 3 is connected to the output terminal of the operational amplifier OP2 through a connection wire 82 and the switch SW4. The terminal Vs+ of the gas sensor 3 is connected to the noninverting input terminal of the operational amplifier OP4 through a connection wire 83. Notably, the voltage of the terminal COM and the voltage of the terminal Vs+ are respectively input to the microcomputer 43 via an unillustrated circuit.

Also, the terminal Vs+ is connected to the Icp supply circuit 53. The Icp supply circuit 53 is a constant current source circuit for supplying the above-described small current Icp. The Icp supply circuit 53, the connection wire 83, the oxygen concentration detection cell 13, and the connection wire 81 are connected in this order and form a current path through which the small current Icp flows.

The inverting input terminal of the operational amplifier OP2 is connected to the Vcent point. A reference voltage of 3.6 V is applied to the noninverting input terminal of the operational amplifier OP2. The output terminal of the operational amplifier OP2 is connected to the terminal Ip+ of the gas sensor 3 through the switch SW4 and the connection wire 82 as described above.

The noninverting input terminal of the operational amplifier OP4 is connected to the terminal Vs+ of the gas sensor 3 through the connection wire 83 as described above. The output terminal of the operational amplifier OP4 is connected to the inverting input terminal of the operational amplifier OP4 and is connected to the noninverting input terminal of the operational amplifier OP1 through the switch SW1. One end of the capacitor C1 is connected to a connection point between the switch SW1 and the operational amplifier OP1, and the other end of the capacitor C1 is grounded.

The output terminal of the operational amplifier OP1 is connected to the inverting input terminal of the operational amplifier OP1 and is connected to an input terminal IT of the PID control circuit 51. The operational amplifier OP1 forms a sample hold circuit together with the capacitor C1 and the switch SW1.

The PID control circuit 51 has a reference terminal RT and an output terminal OT in addition to the above-mentioned input terminal IT. The reference terminal RT is connected to the Vcent point. The output terminal OT is connected to the Vcent point through the resistor R1.

The PID control circuit 51 controls, by means of PID control, the magnitude of the pump current Ip such that the voltage difference between the voltage of the terminal Vs+ applied to the input terminal IT through the operational amplifier OP4 and the operational amplifier OP1 and the voltage at the Vcent point applied to the reference terminal RT becomes equal to a first target voltage (in the present embodiment, 450 mV) set as a control target voltage. Specially, the deviation, from the target control voltage, of the voltage Vs generated between the opposite ends of the oxygen concentration detection cell 13 is PID-computed by the PID control circuit 51 and is fed back to the operational amplifier OP2, so that the operational amplifier OP2 supplies the pump current Ip to the pump cell 11.

The differential amplification circuit 52 differentially amplifies the voltage across the resistor R1 which converts the magnitude of the pump current Ip to a voltage signal (namely, the difference between the potential Vcent and the potential Vpid of the output terminal OT of the PID control circuit 51) and outputs the amplified voltage as a gas detection signal Vip. The output terminal of the differential amplification circuit 52 is connected to the output terminal 59 of the sensor control circuit 41.

The inverting input terminal of the operational amplifier OP3 is connected to the output terminal of the operational amplifier OP4 through a resistor. The noninverting input terminal of the operational amplifier OP3 is connected to the output terminal of the operational amplifier OP1 through a resistor. The output terminal of the operational amplifier OP3 is connected to the noninverting input terminal of the operational amplifier OP5 through the switch SW2 and the resistor R2. One end of the capacitor C2 is connected to the connection point between the resistor R2 and the operational amplifier OP5, and the other end of the capacitor C2 is grounded. The output terminal of the operational amplifier OP5 is connected to the inverting input terminal of the operational amplifier OP5 and is connected to the output terminal 60 of the sensor control circuit 41. The operational amplifier OP5 forms a signal hold circuit in cooperation with the capacitor C2, the switch SW2, and the resistor R2.

The current source 54 supplies a constant current −Iconst. One end of the current source 54 is connected to the terminal Vs+ of the gas sensor 3 through the switch SW2 and the connection wire 83, and the other end of the current source 54 is grounded.

The current source 55 supplies a constant current +Iconst which is opposite in polarity to the constant current −Iconst. One end of the current source 55 is connected to a power supply, and the other end of the current source 55 is connected to the terminal Vs+ of the gas sensor 3 through the switch SW3 and the connection wire 83.

The current source 56 supplies a constant current −Iconst. One end of the current source 56 is connected to the power supply, and the other end of the current source 56 is connected to the terminal COM of the gas sensor 3 through the switch SW2 and the connection wire 81.

The current source 57 supplies a constant current +Iconst. One end of the current source 57 is connected to the terminal COM of the gas sensor 3 through the switch SW3 and the connection wire 81, and the other end of the current source 57 is grounded.

The control section 58 is a logic circuit formed in the ASIC and executes a control of turning on and off the switches SW1, SW2, SW3, and SW4. The control section 58 receives, through the reception port 61 of the sensor control circuit 41, data transmitted from the microcomputer 43.

Next, operation of the sensor control apparatus 1 for detection of the oxygen concentration will be described.

When the oxygen concentration is detected, the control section 58 turns on the switches SW1 and SW4 and turns off the switches SW2 and SW3. As a result, the voltage of the terminal Vs+ of the gas sensor 3 is applied to the input terminal IT of the PID control circuit 51 through the operational amplifier OP4 and the operational amplifier OP1 each configured as a voltage follower. As described above, the PID control circuit 51 executes PID computation on the basis of the deviation of the voltage Vs from the target control voltage, and the operational amplifier OP2 supplies the pump current Ip to the pump cell 11. Further, as described above, the differential amplification circuit 52 outputs the gas detection signal Vip to the microcomputer 43. The microcomputer 43 convers the voltage value of the gas detection signal Vip to a digital value by using an unillustrated A/D conversion circuit, and then computes an oxygen concentration corresponding to the gas detection signal Vip on the basis of a map or a calculation expression provided in the microcomputer 43.

Next, operation of the sensor control apparatus 1 for detection of the impedance Rpvs of the oxygen concentration detection cell 13 will be described.

When the impedance Rpvs is detected, the control section 58 turns on the switches SW2 and SW4 and turns off the switches SW1 and SW3. As a result, the voltage of the terminal Vs+ immediately before the switch SW1 is turned off is held by the capacitor C1. Therefore, the operational amplifier OP1 outputs to the PID control circuit 51 and the operational amplifier OP3 the voltage of the terminal Vs+ immediately before the switch SW1 is turned off.

Further, the current source 56, one switch SW2, the connection wire 81, the oxygen concentration detection cell 13, the connection wire 83, another switch SW2, and the current source 54 are connected in this order, whereby a current path through which the constant current −Iconst flows is formed. As a result, the voltage of the terminal Vs+ at the time when the constant current −Iconst flows to the oxygen concentration detection cell 13 is applied to the noninverting input terminal of the operational amplifier OP4. Therefore, the operational amplifier OP4 outputs to the operational amplifier OP3 the voltage of the terminal Vs+ at the time when the constant current −Iconst flows to the oxygen concentration detection cell 13.

The operational amplifier OP3 constitutes a differential amplification circuit. Therefore, the operational amplifier OP3 outputs, as a difference voltage ΔVs, a voltage corresponding to the difference between the voltage of the terminal Vs+ input from the operational amplifier OP1 and the voltage of terminal Vs+ input from the operational amplifier OP4. Namely, the operational amplifier OP3 outputs the difference voltage ΔVs, which corresponds to the difference between the voltage of terminal Vs+ immediately before the switch SW1 is turned off and the voltage of terminal Vs+ at the time when the constant current −Iconst is flowing. Since the switches SW2 are on, the difference voltage ΔVs is applied to the noninverting input terminal of the operational amplifier OP5. As a result, the operational amplifier OP5 outputs the difference voltage ΔVs to the output terminal 60. Notably, the impedance Rpvs of the oxygen concentration detection cell 13 is computed by dividing the difference voltage ΔVs by the current value of the constant current −Iconst.

When a previously set first pulse-on time (in the present embodiment, 60 μs) elapses after the switches SW2 have been turned on, the control section 58 turns on the switches SW3 and SW4 and turns off the switches SW1 and SW2. As a result, the difference voltage ΔVs immediately before the switches SW2 are turned off is held by the capacitor C2. Therefore, the operational amplifier OP5 outputs to the output terminal 60 the difference voltage ΔVs immediately before the switches SW2 are turned off.

Further, the current source 55, one of the switches SW3, the connection wire 83, the oxygen concentration detection cell 13, the connection wire 81, the other of the switches SW3, and the current source 57 are connected in this order, whereby a current path through which the constant current +Iconst flows is formed. As a result, the constant current +Iconst flows to the oxygen concentration detection cell 13. By supplying the current of the opposite polarity to the oxygen concentration detection cell 13 in this manner, the time required for the voltage Vs produced in the oxygen concentration detection cell 13 to return to a normal value can be shortened.

When a previously set second pulse-on time (in the present embodiment, 60 μs) elapses after the switches SW3 have been turned on, the control section 58 turns off the switches SW3. Subsequently, when a stabilization waiting time which is previously set as a time required for the oxygen concentration detection cell 13 to output the voltage Vs corresponding to the oxygen concentration in the exhaust gas elapses, the control section 58 turns on the switch SW1.

As described above, the sensor control circuit 41 outputs the gas detection signal Vip corresponding to the oxygen concentration in the exhaust gas and periodically updates and outputs the difference voltage ΔVs corresponding to the impedance Rpvs of the oxygen concentration detection cell 13.

In the sensor control apparatus 1 configured as described above, the microcomputer 43 executes an impedance detection process, a deterioration determination process, a concentration computation process, a target correction process, and a heater control process, which will be described later.

Next, the steps of the impedance detection process executed by the microcomputer 43 will be described. The impedance detection process is a process executed when the key switch of the vehicle is switched from its ON state to its OFF state. Notably, when the key switch is switched from the ON state to the OFF state, the engine ECU 9 executes an engine stopping process for stopping the engine 5.

Figure 4:
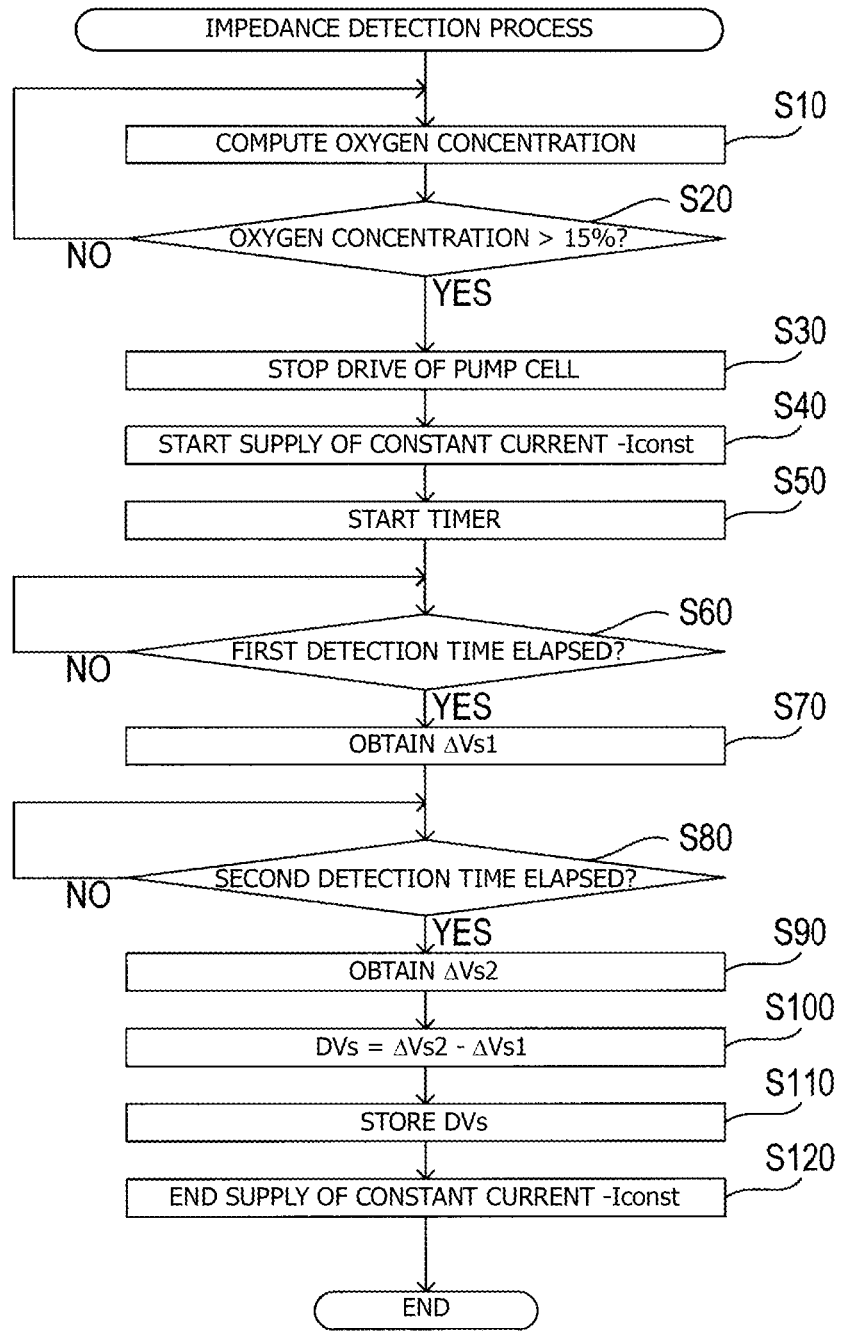
FIG. 4 is a flowchart showing an impedance detection process of a first embodiment.

When the impedance detection process is executed, as shown in FIG. 4, the microcomputer 43 first calculates the oxygen concentration in the exhaust gas in S10 on the basis of the latest gas detection signal Vip obtained from the sensor control circuit 41. In S20, the microcomputer 43 determines whether or not the oxygen concentration computed in S10 is greater than 15%. In the case where the oxygen concentration is equal to or less than 15%, the microcomputer 43 proceeds to S10. Meanwhile, in the case where the oxygen concentration is greater than 15%, the microcomputer 43 stops the drive of the pump cell 11 in S30. Specifically, the microcomputer 43 transmits to the control section 58 of the sensor control circuit 41 an energization end instruction for instructing the control section 58 to turn off the switch SW4.

Subsequently, in S40, the microcomputer 43 starts the supply of the constant current −Iconst. Specifically, the microcomputer 43 transmits to the control section 58 of the sensor control circuit 41 an energization start instruction for instructing the control section 58 to turn on the switches SW2 and turn off the switches SW1, SW3, and SW4.

Next, in S50, the microcomputer 43 starts a timer provided in the RAM. This timer is a timer which is incremented at intervals of, for example, 1 μs. When the timer is started, its value is incremented from 0 (namely, 1 is added to the value). Subsequently, the microcomputer 43 judges in S60 whether or not a previously set first detection time (in the present embodiment, 60 μs) has elapsed. Specifically, the microcomputer 43 judges whether or not the value of the timer is equal to or greater than a value corresponding to the first detection time.

In the case where the first detection time has not yet elapsed, the microcomputer 43 waits by repeating the process of S60 until the first detection time elapses. When the first detection time elapses, in S70, the microcomputer 43 obtains, as a first difference voltage ΔVs1, the latest difference voltage ΔVs input to the microcomputer 43.

Further, the microcomputer 43 judges in S80 whether or not a previously set second detection time (in the present embodiment, 1 ms) has elapsed. Specifically, the microcomputer 43 judges whether or not the value of the timer is equal to or greater than a value corresponding to the second detection time.

In the case where the second detection time has not yet elapsed, the microcomputer 43 waits by repeating the process of S80 until the second detection time elapses. When the second detection time elapses, in S90, the microcomputer 43 obtains, as a second difference voltage ΔVs2, the latest difference voltage ΔVs input to the microcomputer 43.

Next, in S100, the microcomputer 43 computes a deterioration determination voltage DVs by subtracting the first difference voltage ΔVs1 from the second difference voltage ΔVs2. Subsequently, in S110, the microcomputer 43 stores the deterioration determination voltage DVs computed in S100 in the flush memory of the microcomputer 43. Subsequently, in S120, the microcomputer 43 ends the supply of the constant current −Iconst, thereby ending the impedance detection process. Specifically, the microcomputer 43 transmits to the control section 58 of the sensor control circuit 41 an energization end instruction for instructing the control section 58 to turn off the switches SW1, SW2, SW3, and SW4.

Next, the steps of the deterioration determination process executed by the microcomputer 43 will be described. The deterioration determination process is executed immediately after electric power is supplied to the microcomputer 43 as a result of switching of the key switch of the vehicle from its OFF state to its ON state, whereby the microcomputer 43 starts.

Figure 5:
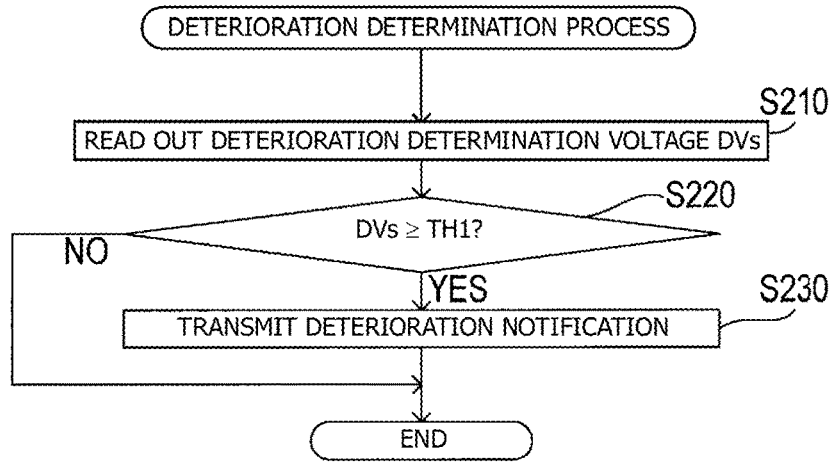
FIG. 5 is a flowchart showing a deterioration determination process.

When the deterioration determination process is executed, as shown in FIG. 5, the microcomputer 43 first reads out the latest deterioration determination voltage DVs from the flush memory in S210. Subsequently, the microcomputer 43 determines in S220 whether or not the deterioration determination voltage DVs read out in S210 is equal to or greater than a previously set deterioration determination value TH1. In the case where the deterioration determination voltage DVs is less than the deterioration determination value TH1, the microcomputer 43 ends the deterioration determination process. Meanwhile, in the case where the deterioration determination voltage DVs is equal to or greater than the deterioration determination value TH1, in S230, the microcomputer 43 transmits to the engine ECU 9 a deterioration notification indicating that the oxygen concentration detection cell 13 has deteriorated, and ends the deterioration determination process.

Next, the steps of the concentration computation process executed by the microcomputer 43 will be described. The concentration computation process is a process which is repeatedly executed when the microcomputer 43 is operating.

Figure 6:
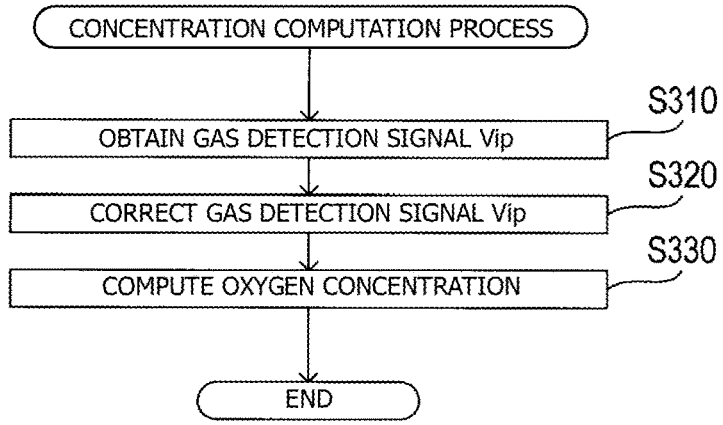
FIG. 6 is a flowchart showing a concentration computation process of the first embodiment.

When the concentration computation process is executed, as shown in FIG. 6, in S310, the microcomputer 43 first obtains the latest gas detection signal Vip input to the microcomputer 43. In S320, the microcomputer 43 corrects the gas detection signal Vip obtained in S310 by using the deterioration determination voltage DVs read out in S210. Specifically, the microcomputer 43 corrects the gas detection signal Vip by referring to, for example, a detection signal correction map in which the correspondence between the value of the deterioration determination voltage DVs and the value of the gas detection signal Vip after correction is set.

In S330, as described above, the microcomputer 43 computes the oxygen concentration corresponding to the gas detection signal Vip corrected in S320, on the basis of the map or the calculation expression provided in the microcomputer 43, and ends the concentration computation process for the present.

Next, the steps of the target correction process executed by the microcomputer 43 will be described. The target correction process is executed immediately after electric power is supplied to the microcomputer 43 as a result of switching of the key switch of the vehicle from its OFF state to its ON state, whereby the microcomputer 43 starts.

Figure 7:
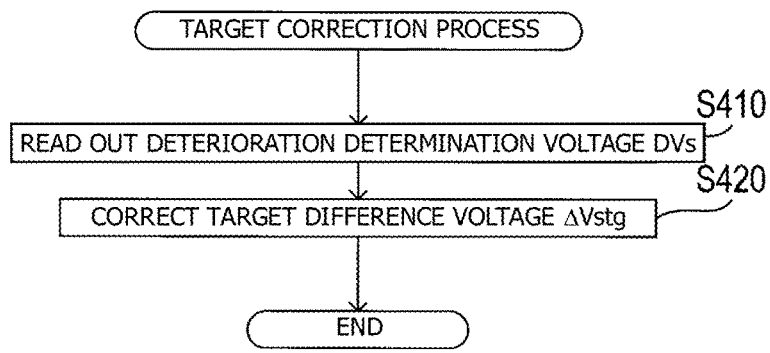
FIG. 7 is a flowchart showing a target correction process.

When the target correction process is executed, as shown in FIG. 7, the microcomputer 43 first reads out the deterioration determination voltage DVs from the flush memory in S410. Subsequently, in S420, the microcomputer 43 corrects a target difference voltage ΔVstg, which is a target value used for the temperature control of the gas sensor 3, and ends the target correction process. Specifically, the microcomputer 43 corrects the target difference voltage ΔVstg by referring to a target difference correction map in which the correspondence between the value of the deterioration determination voltage DVs and the value of the target difference voltage ΔVstg after correction is set.

Next, the steps of the heater control process executed by the microcomputer 43 will be described. The heater control process is a process which is repeatedly executed when the microcomputer 43 is operating.

Figure 8:
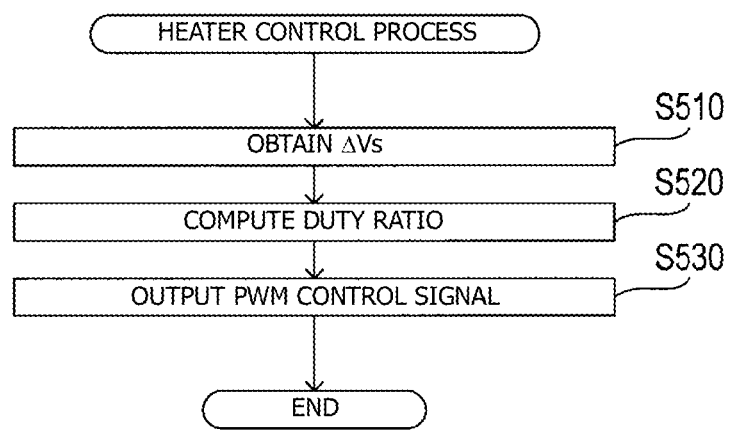
FIG. 8 is a flowchart showing a heater control process.

When the heater control process is executed, as shown in FIG. 8, in S510, the microcomputer 43 first obtains the latest difference voltage ΔVs input to the microcomputer 43. Further, in S520, the microcomputer 43 computes the duty ratio of electric power supplied to the heater 30 on the basis of the difference voltage ΔVs obtained in S510 such that the difference voltage ΔVs becomes equal to the corrected target difference voltage ΔVstg.

Subsequently, in S530, the microcomputer 43 outputs to the heater control circuit 42 a PWM control signal corresponding to the duty ratio computed in S520, and ends the heater control process.

Figure 9:
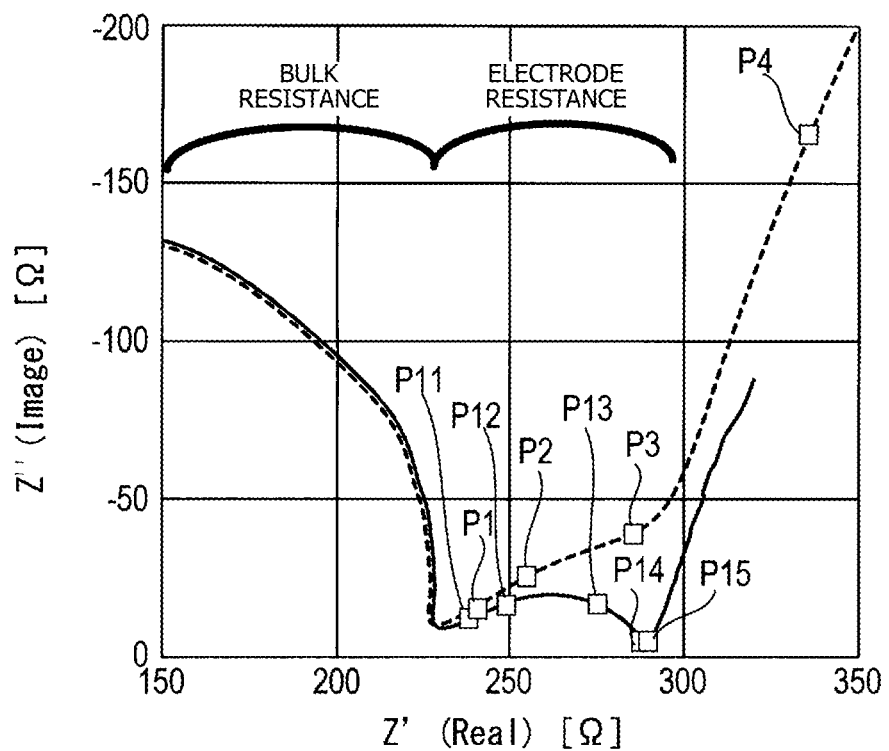
FIG. 9 is a complex impedance plot of impedance Rpvs.

FIG. 9 is a complex impedance plot of the impedance Rpvs of the oxygen concentration detection cell 13 for the cases where the supply time of the constant current −Iconst is 60 μs, 0.3 ms, 1.0 ms, 10 ms, and 100 ms, respectively.

Measurement points P1, P2, P3, and P4 respectively show the impedances Rpvs when the supply time is 60 μs, 0.3 ms, 1.0 ms, and 10 ms for the case where the oxygen concentration within the measurement chamber 28 is 20%.

Measurement points P11, P12, P13, P14, and P15 respectively show the impedances Rpvs when the supply time is 60 μs, 0.3 ms, 1.0 ms, 10 ms, and 100 ms for the case where the oxygen concentration within the measurement chamber 28 is 0.1%.

Figure 10:
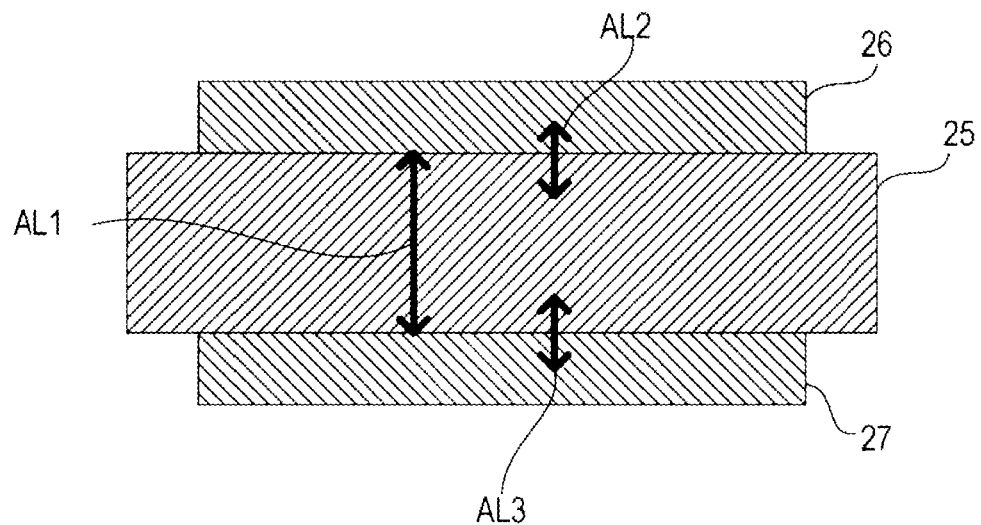
FIG. 10 is a cross-sectional view of an oxygen concentration detection cell 13 for describing bulk resistance and electrode resistance.

As indicated by an arrow AL1 of FIG. 10, the bulk resistance of the oxygen concentration detection cell 13 is a resistance generated when the constant current −Iconst flows through the interior of the oxygen-ion-conductive solid electrolyte body 25. In the present embodiment, the bulk resistance of the oxygen concentration detection cell 13 is defined to be the real part Z' of the impedance Rpvs at the time when the supply time of the constant current −Iconst is 60 μs. Accordingly, the bulk resistance in the case where the oxygen concentration is 20% is the real part Z' of the impedance Rpvs at the measurement point P1. Further, the bulk resistance in the case where the oxygen concentration is 0.1% is the real part Z' of the impedance Rpvs at the measurement point P11.

Also, as indicated by arrows AL2 and AL3 of FIG. 10, the electrode resistance of the oxygen concentration detection cell 13 is a resistance which is generated when the constant current −Iconst flows through the interfaces between the oxygen-ion-conductive solid electrolyte body 25 and the detection electrodes 26 and 27. In the present embodiment, the electrode resistance of the oxygen concentration detection cell 13 is defined to be a value obtained by subtracting the real part Z' of the impedance Rpvs at the time when the supply time of the constant current −Iconst is 60 μs from the real part Z' of the impedance Rpvs at the time when the supply time of the constant current −Iconst is 1.0 ms. Accordingly, the electrode resistance in the case where the oxygen concentration is 20% is a value obtained by subtracting the real part Z' of the impedance Rpvs at the measurement point P1 from the real part Z' of the impedance Rpvs at the measurement point P3. Further, the electrode resistance in the case where the oxygen concentration is 0.1% is a value obtained by subtracting the real part Z' of the impedance Rpvs at the measurement point P11 from the real part Z' of the impedance Rpvs at the measurement point P13.

Figure 11:
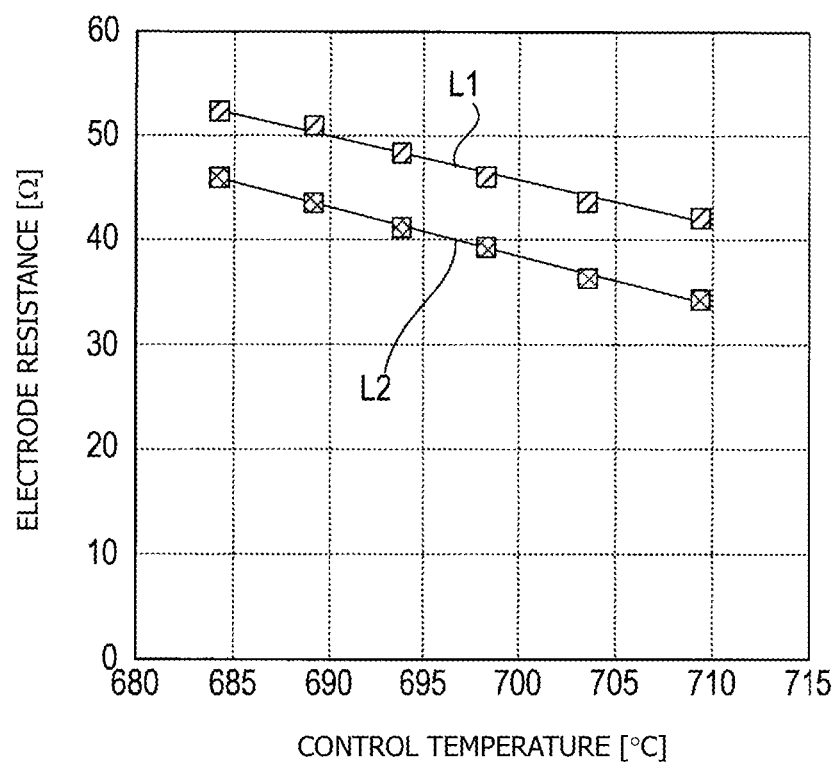
FIG. 11 is a graph showing the relation between electrode resistance and control temperature.

FIG. 11 is a graph showing the relation between the electrode resistance of the oxygen concentration detection cell 13 and the control temperature of the gas sensor 3 for the case where the oxygen concentration is 20% and the case where the oxygen concentration is 0.1%. In FIG. 11, a straight line L1 shows the relation between the electrode resistance of the oxygen concentration detection cell 13 and the control temperature of the gas sensor 3 for the case where the oxygen concentration is 20%, and a straight line L2 shows the relation between the electrode resistance of the oxygen concentration detection cell 13 and the control temperature of the gas sensor 3 for the case where the oxygen concentration is 0.1%. As shown in FIG. 11, the electrode resistance of the oxygen concentration detection cell 13 decreases linearly as the control temperature of the gas sensor 3 increases. Also, the rate of change in the electrode resistance with the control temperature in the case where the oxygen concentration is 20% is approximately the same as that in the case where the oxygen concentration is 0.1%. Notably, the control temperature of the gas sensor 3 refers to a target temperature which is set for executing constant temperature control for the gas sensor 3 by using the heater.

Figure 12:
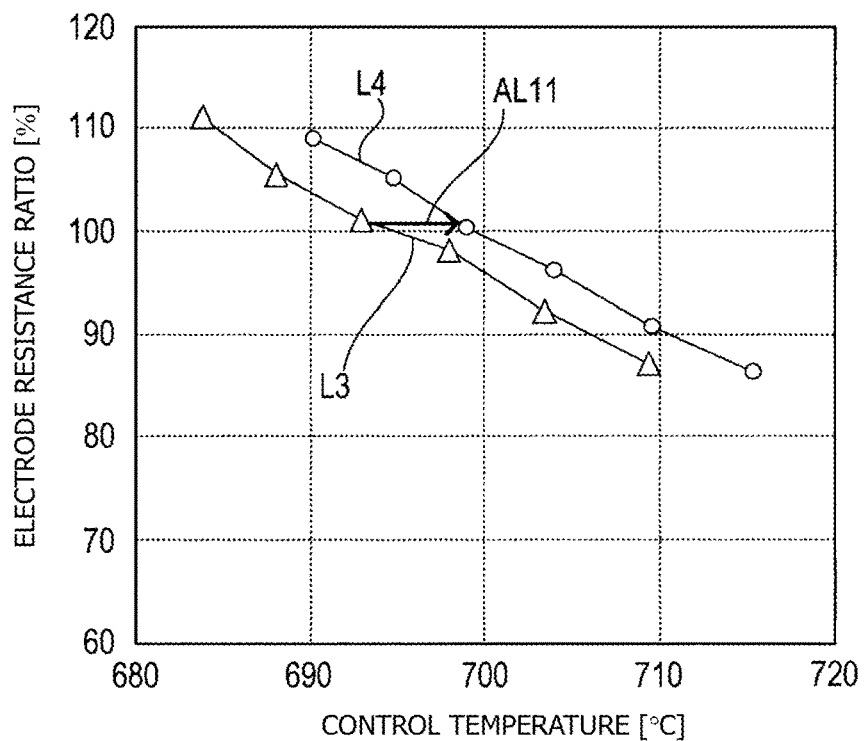
FIG. 12 is a graph showing the relation between electrode resistance ratio and control temperature for the case where the concentration of oxygen is 0.1%.

FIG. 12 is a graph showing the relation between the electrode resistance ratio and the control temperature of the gas sensor 3 for the case where the oxygen concentration is 0.1%. In FIG. 12, a polygonal line L3 represents the relation between the control temperature and the electrode resistance ratio of the oxygen concentration detection cell 13 when a brand-new gas sensor 3 was driven under the constant temperature control (normal drive). A polygonal line L4 represents the relation between the control temperature and the electrode resistance ratio of the oxygen concentration detection cell 13 of the gas sensor 3 after having deteriorated due to an endurance test; i.e., after the brand-new gas sensor 3 was continuously driven for 150 hours (continuous energization). The electrode resistance ratio is a value normalized using the electrode resistance of the oxygen concentration detection cell 13 at the time when the brand-new gas sensor 3 was driven with the control temperature set to 695° C.

As indicated by an arrow AL11 of FIG. 12, the control temperature at the same electrode resistance ratio differs between the state in which the brand-new gas sensor 3 was driven under the constant temperature control and the state after the gas sensor 3 was continuously driven for 150 hours under the constant temperature control. The difference of the control temperature is about 5° C. Namely, in the case where the oxygen concentration is 0.1%, there is a tendency that the corresponding relation between the electrode resistance of the oxygen concentration detection cell 13 and the control temperature of the gas sensor 3 changes greatly and no correlation can be obtained between the electrode resistance and the control temperature.

Figure 13:
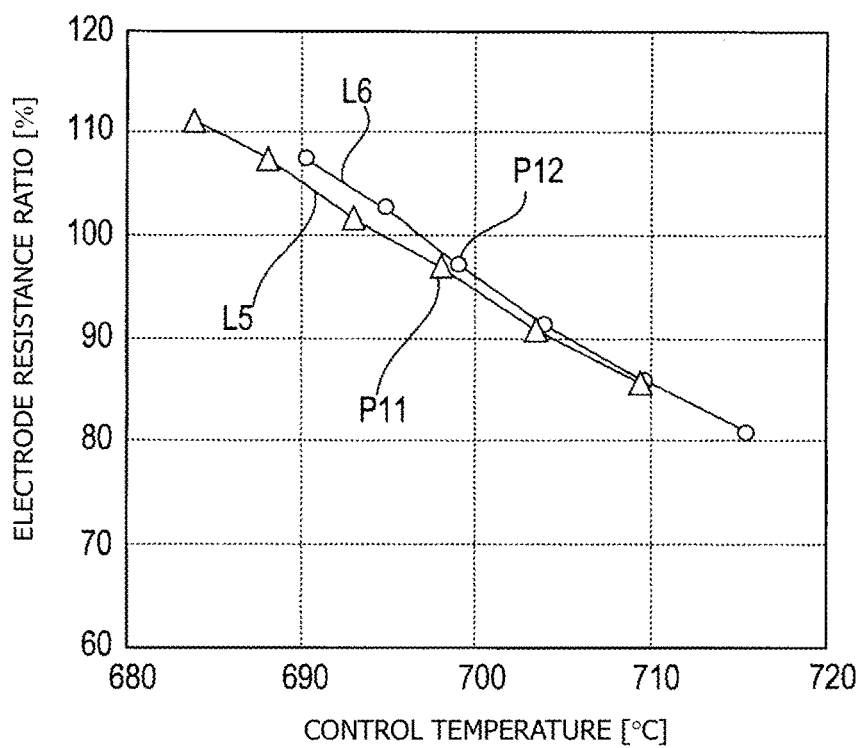
FIG. 13 is a graph showing the relation between electrode resistance ratio and control temperature for the case where the concentration of oxygen is 20%.

FIG. 13 is a graph showing the relation between the electrode resistance ratio and the control temperature of the gas sensor 3 for the case where the oxygen concentration is 20%. In FIG. 13, a polygonal line L5 represents the relation between the control temperature and the electrode resistance ratio of the oxygen concentration detection cell 13 when a brand-new gas sensor 3 was driven under the constant temperature control (normal drive). A polygonal line L6 represents the relation between the control temperature and the electrode resistance ratio of the oxygen concentration detection cell 13 after the brand-new gas sensor 3 was continuously driven for 150 hours (continuous energization).

As shown by, for example, the measurement points P11 and P12 in FIG. 13, the control temperature at the same electrode resistance ratio differs between the state in which the brand-new gas sensor 3 was driven under the constant temperature control and the state after the gas sensor 3 was continuously driven for 150 hours under the constant temperature control. The difference of the control temperature is about 1° C. Namely, in the case where the oxygen concentration is 20%, there is a tendency that a change in the corresponding relation between the electrode resistance of the oxygen concentration detection cell 13 and the control temperature of the gas sensor 3 is small and a correlation can be obtained between the electrode resistance and the control temperature.

The sensor control apparatus 1 configured as described above controls the gas sensor 3. The gas sensor 3 includes the measurement chamber 28 into which exhaust gas is introduced, the oxygen concentration detection cell 13, and the pump cell 11.

The oxygen concentration detection cell 13 includes the oxygen-ion-conductive solid electrolyte body 25 and the paired detection electrodes 26 and 27 formed on the oxygen-ion-conductive solid electrolyte body 25. The detection electrode 26 is disposed to face the measurement chamber 28, and the detection electrode 27 is disposed in the reference gas chamber 29 in which a reference gas atmosphere is created, so that a voltage corresponding to the oxygen partial pressure difference between the measurement chamber 28 and the reference gas chamber 29 is generated.

The pump cell 11 includes the oxygen-ion-conductive solid electrolyte body 21 and the paired pump electrodes 22 and 23 formed on the oxygen-ion-conductive solid electrolyte body 21. The pump electrode 23 is disposed to face the measurement chamber 28. In accordance with the pump current flowing between the paired pump electrodes 22 and 23, oxygen contained in the exhaust gas introduced into the measurement chamber 28 is pumped out or oxygen is pumped into the measurement chamber 28. The sensor control apparatus 1 controls the supply state of the pump current flowing between the pair of pump electrodes 22 and 23 of the pump cell 11 such that the voltage generated between the pair of detection electrodes 26 and 27 of the oxygen concentration detection cell 13 becomes equal to the first target voltage (in the present embodiment, 450 mV) set as the control target voltage.

The sensor control apparatus 1 judges whether or not the concentration of oxygen contained in the measurement chamber 28 is greater than 15%. In the case where the sensor control apparatus 1 judges that the oxygen concentration is greater than 15%, the sensor control apparatus 1 supplies the constant current −Iconst to the oxygen concentration detection cell 13.

At the point in time when the previously set first detection time elapses after the supply of the constant current −Iconst has been started, the sensor control apparatus 1 detects the first difference voltage ΔVs1 which is generated in the oxygen concentration detection cell 13 as a result of the flow of the constant current −Iconst to the oxygen concentration detection cell 13. At the point in time when the second detection time previously set to be longer than the first detection time elapses after the supply of the constant current −Iconst has been started, the sensor control apparatus 1 detects the second difference voltage ΔVs2 which is generated in the oxygen concentration detection cell 13 as a result of the flow of the constant current −Iconst to the oxygen concentration detection cell 13.

As described above, the sensor control apparatus 1 detects the first difference voltage ΔVs1 at the point in time when the first detection time elapses after the supply of the constant current −Iconst to the oxygen concentration detection cell 13 has been started, and detects the second difference voltage ΔVs2 at the point in time when the second detection time elapses after the supply of the constant current −Iconst to the oxygen concentration detection cell 13 has been started. Therefore, the sensor control apparatus 1 can obtain information necessary for judging whether or not the gas sensor 3 has deteriorated (namely, the first difference voltage ΔVs1 and the second difference voltage ΔVs2) within a short period of time. Thus, the sensor control apparatus 1 can detect deterioration of the gas sensor 3 within a short period of time.

Also, the sensor control apparatus 1 detects the first cell voltage and the second cell voltage when the concentration of oxygen contained in the measurement chamber 28 is greater than 15%. Thus, even when the period of time during which the constant current −Iconst flows to the oxygen concentration detection cell 13 becomes longer, as shown in FIG. 13, it is possible to suppress a change in the corresponding relation between the electrode resistance of the oxygen concentration detection cell 13 and the control temperature of the gas sensor 3. Namely, from the viewpoint of enhancing the accuracy in detecting deterioration of the gas sensor 3, it is preferred to detect the first cell voltage and the second cell voltage upon satisfaction of the deterioration detection condition showing that the concentration of oxygen contained in the measurement chamber 28 is greater than 15%. Notably, the first difference voltage ΔVs1 and the second difference voltage ΔVs2 change with the impedance Rpvs of the oxygen concentration detection cell 13. As described above, the impedance Rpvs of the oxygen concentration detection cell 13 includes at least the bulk resistance and the electrode resistance. Therefore, the sensor control apparatus 1 can enhance the accuracy in detecting deterioration of the gas sensor 3.

Also, the sensor control apparatus 1 computes the deterioration determination voltage DVs by subtracting the first difference voltage ΔVs1 from the second difference voltage ΔVs2, and judges whether or not the gas sensor 3 has deteriorated on the basis of the deterioration determination voltage DVs. As a result, the sensor control apparatus 1 can accurately detect the deterioration of the gas sensor 3.

Also, the sensor control apparatus 1 corrects the gas detection signal Vip on the basis of the deterioration determination voltage DVs. As result, the sensor control apparatus 1 can prevent a decrease in oxygen concentration detection accuracy even when the impedance Rpvs changes due to deterioration of the gas sensor 3.

Also, the sensor control apparatus 1 supplies the constant current −Iconst to the oxygen concentration detection cell 13. At the point when the previously set first pulse-on time elapses after the supply of the constant current −Iconst has been started, the sensor control apparatus 1 detects the difference voltage ΔVs which is generated in the oxygen concentration detection cell 13 as a result of the flow of the constant current −Iconst to the oxygen concentration detection cell 13.

Also, the sensor control apparatus 1 controls the energization of the heater 30, which heats the oxygen concentration detection cell 13 and the pump cell 11, through use of the difference voltage ΔVs. The sensor control apparatus 1 corrects the energization control of the heater 30 by correcting the target difference voltage ΔVstg on the basis of the deterioration determination voltage DVs.

As a result, the sensor control apparatus 1 can prevent a decrease in the accuracy of the temperature control of the gas sensor 3 by the heater 30 even when the difference voltage ΔVs changes due to the deterioration of the gas sensor 3.

In the embodiment described above, the exhaust gas corresponds to the gas under measurement, the oxygen-ion-conductive solid electrolyte body 25 corresponds to the first solid electrolyte body, and the detection electrodes 26 and 27 correspond to the pair of first electrodes.

Also, the oxygen-ion-conductive solid electrolyte body 21 corresponds to the second solid electrolyte body, and the pump electrodes 22 and 23 correspond to the processing as the pair of second electrodes.

Also, S20 corresponds to the processing as the condition judgment section, S40 corresponds to the processing as the energization-for-detection section, S60 and S70 correspond to the processing as the first detection section, and S80 and S90 correspond to the processing as the second detection section.

Also, the constant current −Iconst corresponds to the deterioration detection current, the first difference voltage ΔVs1 corresponds to the first cell voltage, and the second difference voltage ΔVs2 corresponds to the second cell voltage.

Also, S220 corresponds to the processing as the deterioration judgment section, and S320 corresponds to the processing as the pump current correction section.

Also, the switches SW2, the current sources 54 and 56, and the control section 58 correspond to the impedance detection energization section, the operational amplifier OP3 corresponds to the third detection section, S510 to S530 correspond to the processing as the heater control section, and S410 to S420 correspond to the processing as the control correction section.

Also, the constant current −Iconst corresponds to the impedance detection current, the first pulse-on time corresponds to the third detection time, the difference voltage ΔVs corresponds to the third cell voltage, and the target difference voltage ΔVstg corresponds to the target value of the controlled variable for controlling the heater.

Second Embodiment

A second embodiment of the present disclosure will now be described with reference to the drawings. Notably, in the second embodiment, portions different from those of the first embodiment will be described. Common constituent elements are denoted by the same reference numerals.

A sensor control apparatus 1 of the second embodiment differs from that of the first embodiment in the point that the sensor control apparatus 1 of the second embodiment executes a changed impedance detection process.

The impedance detection process of the second embodiment differs from that of the first embodiment in the point that the processes of S810 to S830 are executed instead of S10 to S30.

Figure 14:
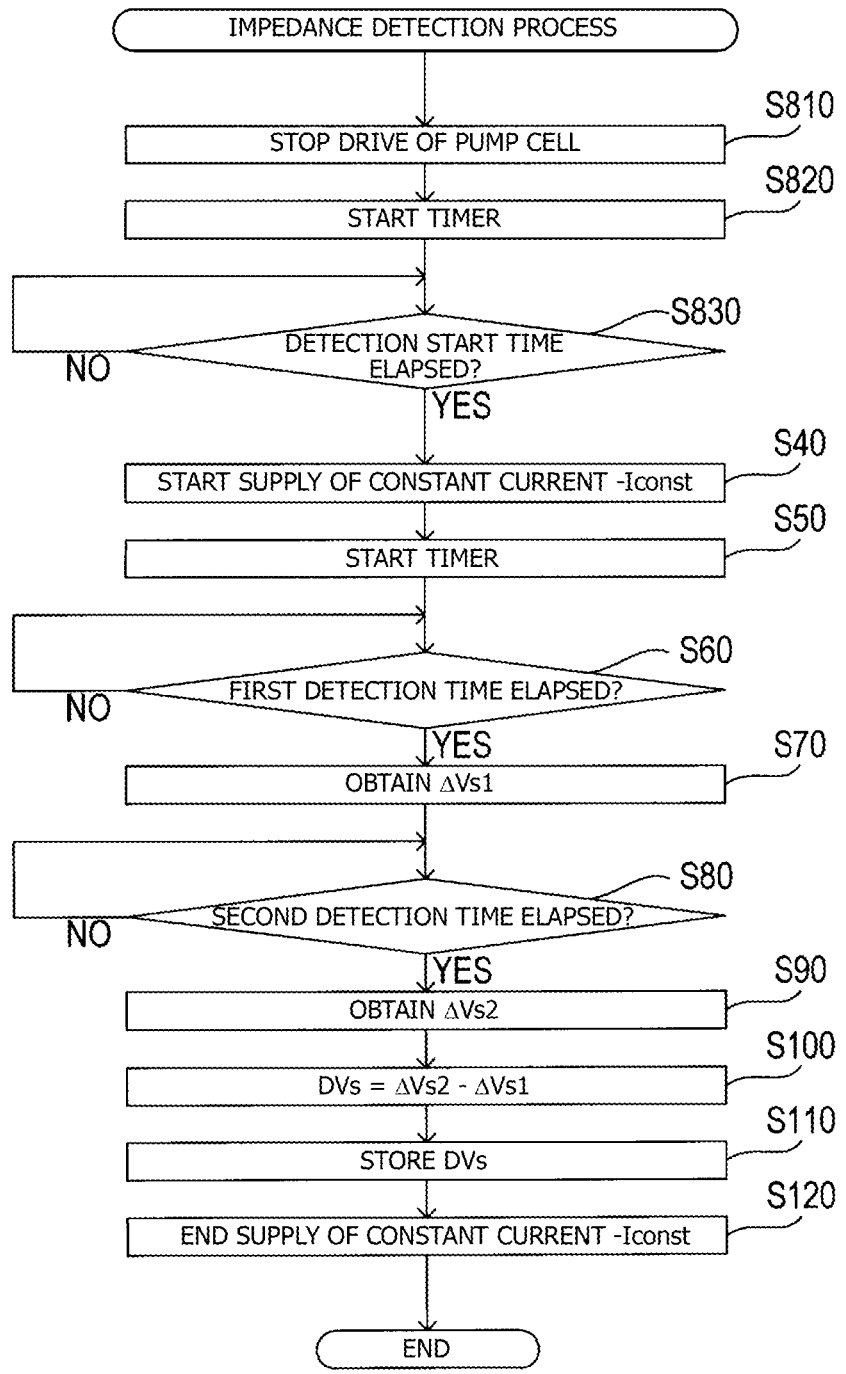
FIG. 14 is a flowchart showing an impedance detection process of a second embodiment.

Namely, when the impedance detection process of the second embodiment is executed, as shown in FIG. 14, the microcomputer 43 first stops the drive of the pump cell 11 in S810 as in S30. Subsequently, the microcomputer 43 starts a timer provided in the RAM in S820 as in S50. After that, the microcomputer 43 judges in S830 whether or not a previously set detection start time (in the present embodiment, for example, 1 second) has elapsed. Specifically, the microcomputer 43 judges whether or not the value of the timer is equal to or greater than a value corresponding to the detection start time.

In the case where the detection start time has not yet elapsed, the microcomputer 43 waits by repeating the process of S830 until the detection start time elapses. Upon elapse of the detection start time, the microcomputer 43 proceeds to S40.

The sensor control apparatus 1 configured as described above stops the pumping out or pumping in of oxygen by the pump cell 11 when the engine 5 of the vehicle stops. When the sensor control apparatus 1 judges that the previously set detection start time has elapsed after the stoppage of the engine 5, the sensor control apparatus 1 supplies the constant current −Iconst to the oxygen concentration detection cell 13.

Further, at the point in time when the previously set first detection time elapses after the supply of the constant current −Iconst has been started, the sensor control apparatus 1 detects the first difference voltage ΔVs1 which is generated in the oxygen concentration detection cell 13 as a result of the flow of the constant current −Iconst to the oxygen concentration detection cell 13. At the point in time when the second detection time previously set to be longer than the first detection time elapses after the supply of the constant current −Iconst has been started, the sensor control apparatus 1 detects the second difference voltage ΔVs2 which is generated in the oxygen concentration detection cell 13 as a result of the flow of the constant current −Iconst to the oxygen concentration detection cell 13.

As described above, the sensor control apparatus 1 detects the first difference voltage ΔVs1 and the second difference voltage ΔVs2 when the previously set detection start time elapses after the engine 5 has stopped, because the concentration of oxygen contained in the measurement chamber 28 can be judged to have become high. As a result, the sensor control apparatus 1 can detect the first cell voltage and the second cell voltage under an atmosphere in which the concentration of oxygen contained in the measurement chamber 28 is high (for example, the concentration of oxygen is greater than 15%). Thus, the accuracy in detecting deterioration of the gas sensor 3 can be enhanced.

In the second embodiment described above, S810 corresponds to the process as the pump cell stoppage section, and S830 corresponds to the process as the condition judgment section.

Third Embodiment

A third embodiment of the present disclosure will now be described with reference to the drawings. Notably, in the third embodiment, portions different from those of the second embodiment will be described. Common constituent elements are denoted by the same reference numerals.

A sensor control apparatus 1 of the third embodiment differs from that of the second embodiment in the point that the sensor control apparatus 1 of the third embodiment executes a changed impedance detection process.

The impedance detection process of the third embodiment differs from that of the second embodiment in the point that the processes of S825 and S835 are executed instead of S820 and S830.

Figure 15:
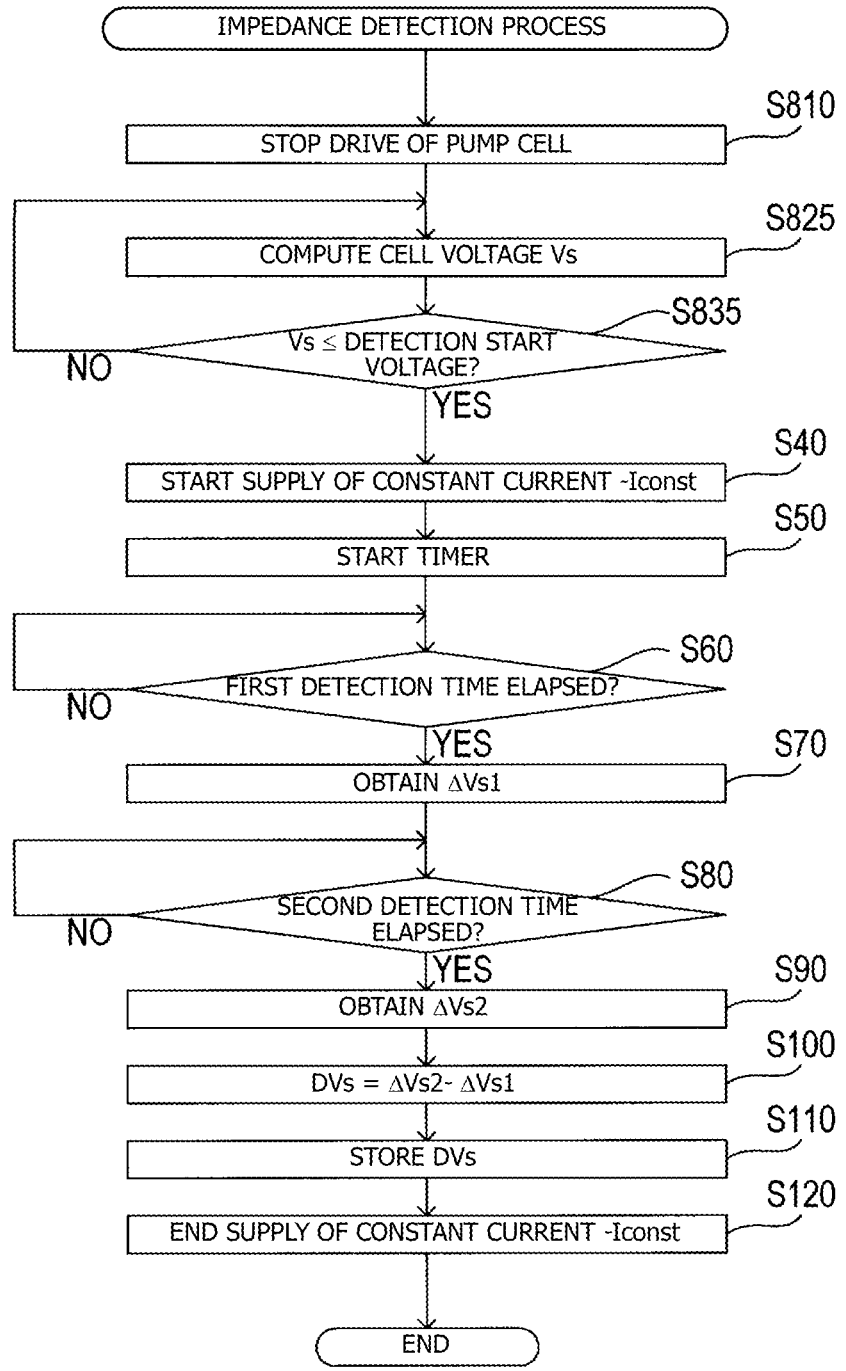
FIG. 15 is a flowchart showing an impedance detection process of a third embodiment.

Namely, in the impedance detection process of the third embodiment, as shown in FIG. 15, after ending the process of S810, in S825, the microcomputer 43 computes, as a cell voltage Vs, the difference between the voltage of the terminal Vs+ and the voltage of the terminal COM. Subsequently, the microcomputer 43 judges in S835 whether or not the cell voltage Vs computed in S825 is equal to or lower than a detection start voltage (in the present embodiment, for example, 0.1 V).

In the case where the cell voltage Vs is higher than the detection start voltage, the microcomputer 43 proceeds to S825. Meanwhile, in the case where the cell voltage Vs is equal to or lower than the detection start voltage, the microcomputer 43 proceeds to S40.

The sensor control apparatus 1 configured as described above supplies the constant current −Iconst to the oxygen concentration detection cell 13 in the case where the engine 5 stops and the cell voltage Vs is judged to be equal to or lower than the previously set detection start voltage.

Further, at the point in time when the previously set first detection time elapses after the supply of the constant current −Iconst has been started, the sensor control apparatus 1 detects the first difference voltage ΔVs1 which is generated in the oxygen concentration detection cell 13 as a result of the flow of the constant current −Iconst to the oxygen concentration detection cell 13. At the point in time when the second detection time previously set to be longer than the first detection time elapses after the supply of the constant current −Iconst has been started, the sensor control apparatus 1 detects the second difference voltage ΔVs2 which is generated in the oxygen concentration detection cell 13 as a result of the flow of the constant current −Iconst to the oxygen concentration detection cell 13.

As described above, the sensor control apparatus 1 detects the first difference voltage ΔVs1 and the second difference voltage ΔVs2 when the cell voltage Vs becomes equal to or lower than the previously set detection start voltage, because the concentration of oxygen contained in the measurement chamber 28 can be judged to have become high. As a result, the sensor control apparatus 1 can detect the first cell voltage and the second cell voltage under an atmosphere in which the concentration of oxygen contained in the measurement chamber 28 is high (for example, the concentration of oxygen is greater than 15%). Thus, the accuracy in detecting deterioration of the gas sensor 3 can be enhanced.

In the third embodiment described above, S835 corresponds to the process as the condition judgment section.

Fourth Embodiment

A fourth embodiment of the present disclosure will now be described with reference to the drawings. Notably, in the fourth embodiment, portions different from those of the first embodiment will be described. Common constituent elements are denoted by the same reference numerals.

A sensor control apparatus 1 of the fourth embodiment differs from that of the first embodiment in the point that the sensor control apparatus 1 of the fourth embodiment executes a changed impedance detection process. Also, whereas the impedance detection process of the first embodiment is executed when the key switch of the vehicle is switched from the ON state to the OFF state, the impedance detection process of the fourth embodiment is executed while the key switch of the vehicle is in the ON state. Also, the sensor control apparatus 1 of the fourth embodiment differs from that of the first embodiment in the point that the sensor control apparatus 1 of the fourth embodiment executes a changed concentration computation process.

Specifically, the sensor control apparatus 1 is configured to execute the impedance detection process upon reception of a process execution signal for the impedance detection process transmitted from the engine ECU 9. The conditions under which the engine ECU 9 transmits the above-described process execution signal may be arbitrarily set at the engine ECU 9. For example, the conditions are set such that the process execution signal is transmitted every time the vehicle travels over a specific distance (for example, 3000 km), every time the vehicle is driven for a fixed time, or when the vehicle satisfies a specific operation condition. Notably, in the present embodiment, every time the vehicle travels over the specific distance, the engine ECU 9 transmits the process execution signal to the sensor control apparatus 1, and the sensor control apparatus 1 executes the impedance detection process in response to reception of the process execution signal.

Figure 16:
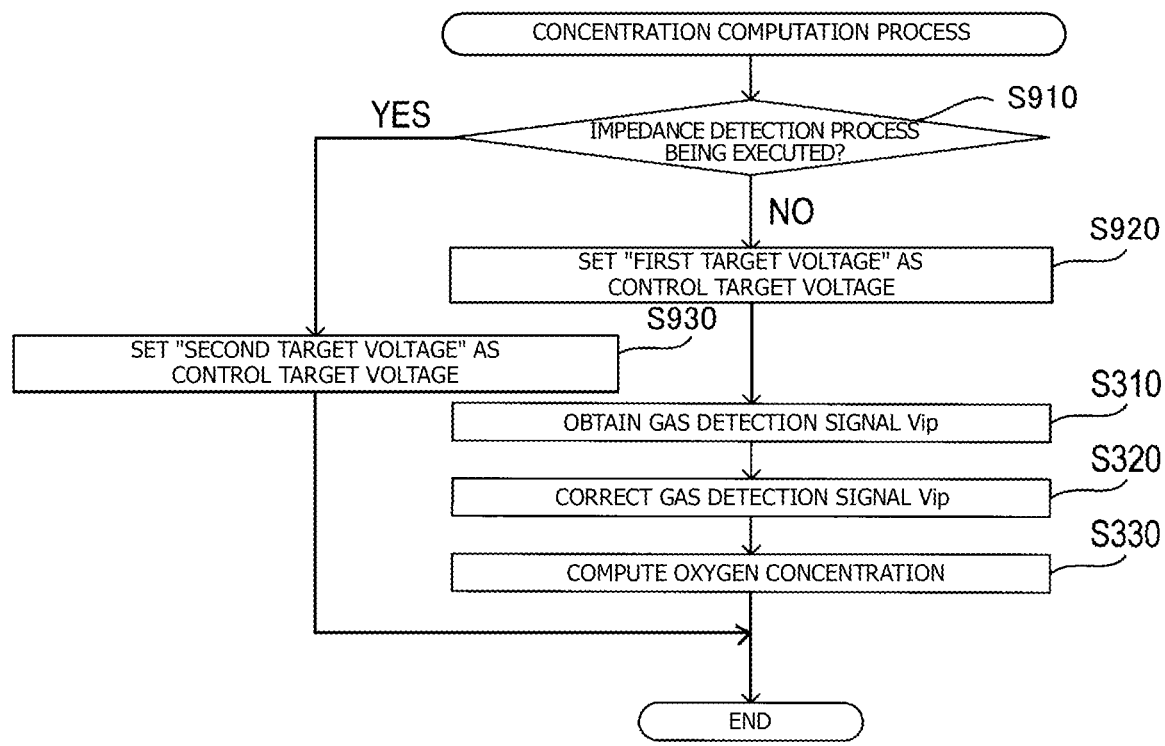
FIG. 16 is a flowchart showing a concentration computation process of a fourth embodiment.

First, the concentration computation process of the fourth embodiment will be described with reference to FIG. 16. In the concentration computation process of the fourth embodiment, the processes of S910 to SS930 are added to the processes of S310 to S330 of the first embodiment. When the concentration computation process of the fourth embodiment is executed, the microcomputer 43 first judges in S910 whether or not the impedance detection process is being executed. In the case where the microcomputer 43 judges in S910 that the impedance detection process is not being executed (S910: NO), the microcomputer 43 proceeds to S920 so as to set the control target voltage for the PID control of the magnitude of the pump current Ip to a first target voltage (in the present embodiment, 450 mV). After executing the process of S920, the microcomputer 43 successively executes the processes of S310 to S330 of the first embodiment.

Meanwhile, in the case where the microcomputer 43 judges in S910 that the impedance detection process is being executed (S910: YES), the microcomputer 43 proceeds to S930 so as to set the control target voltage for the PID control of the magnitude of the pump current Ip to a second target voltage (in the present embodiment, 20 mV), and ends the concentration computation process. Notably, in the present fourth embodiment, this concentration computation process is repeatedly executed at predetermined intervals in the period during which the key switch of the vehicle is in the ON state.

In the case where the control target voltage is set to the first target voltage (in the present embodiment, 450 mV), the sensor control apparatus 1 controls the supply of the pump current Ip flowing to the pump cell 11 such that the atmosphere of the measurement chamber 28 becomes the same state as that when the air-fuel ratio is the stoichiometric air-fuel ratio as described in the first embodiment as well. This first target voltage corresponds to the control target voltage set during the period during which the oxygen concentration is detected by the gas sensor 3.

Meanwhile, in the case where the control target voltage is set to the second target voltage (in the present embodiment, 20 mV) lower than the first target voltage, the sensor control apparatus 1 performs energization control for supplying the pump current Ip such that the concentration of oxygen contained in the measurement chamber 28 becomes higher than that when the air-fuel ratio is the stoichiometric air-fuel ratio. In the state in which the control target voltage is set to the second target voltage as described above, the sensor control apparatus 1 performs the energization control for the gas sensor 3 such that the concentration of oxygen contained in the measurement chamber 28 becomes higher than that in the case where the control target voltage is set to the first target voltage. As will be described later, this second target voltage corresponds to the control target voltage set during the period during which deterioration of the gas sensor 3 is detected.

Figure 17:
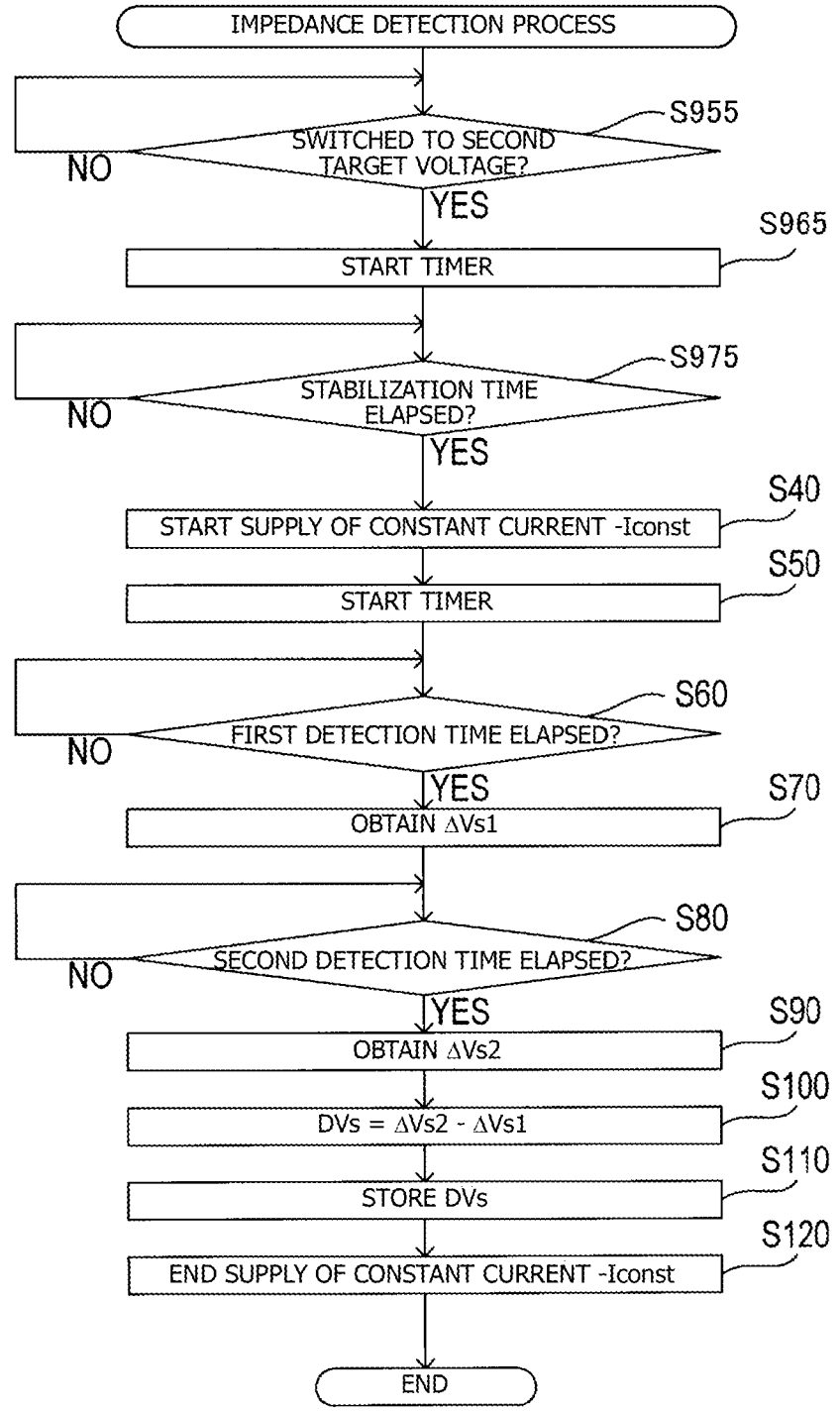
FIG. 17 is a flowchart showing an impedance detection process of the fourth embodiment.

Next, the impedance detection process of the fourth embodiment will be described with reference to FIG. 17. In the impedance detection process of the fourth embodiment, the processes of S955, S965, and S975 are executed instead of S10 to S30 of the first embodiment. Namely, when the impedance detection process of the fourth embodiment is executed, the microcomputer 43 first judges in S955 whether or not the control target voltage has been switched to the second target voltage. As described above, when the sensor control apparatus 1 receives the process execution signal for the impedance detection process from the engine ECU 9, the control target voltage is set to the second target voltage through the processes of S910 and S920 of the concentration detection process shown in FIG. 15. In the impedance detection process, the microcomputer 43 judges whether or not the control target voltage has been switched from the first target voltage to the second target voltage in the concentration detection process. In the case where the control target voltage has not yet been switched to the second target voltage, the microcomputer 43 waits by repeating the process of S955 until the control target voltage is switched to the second target voltage. In the case where the microcomputer 43 judges that the control target voltage has been switched to the second target voltage, the microcomputer 43 proceeds to S965.

In S965, the microcomputer 43 starts a timer provided in the RAM. After that, the microcomputer 43 judges in S965 whether or not a previously set stabilization time (in the present embodiment, for example, 5 seconds) has elapsed. Specifically, the microcomputer 43 judges whether or not the value of the timer is equal to or greater than a value corresponding to the stabilization time. In the case where the stabilization time has not yet elapsed, the microcomputer 43 waits by repeating the process of S975 until the stabilization time elapses. Upon elapse of the stabilization time, the microcomputer 43 proceeds to S40 and successively executes the processes of S50 to S120 in the same manner as in the first embodiment.

The sensor control apparatus 1 configured as described above switches the control target voltage from the first target voltage to the second target voltage upon reception of the process execution signal for the impedance detection process from the engine ECU 9. The sensor control apparatus 1 controls the supply state of the pump current Ip in a state in which the control target voltage is set to the second target voltage, thereby increasing the concentration of oxygen contained in the measurement chamber 28. When the sensor control apparatus 1 judges that the previously set stabilization time has elapsed after the switching of the control target voltage from the first target voltage to the second target voltage, the sensor control apparatus 1 supplies the constant current −Iconst to the oxygen concentration detection cell 13.

Further, at the point in time when the previously set first detection time elapses after the supply of the constant current −Iconst has been started, the sensor control apparatus 1 detects the first difference voltage ΔVs1 which is generated in the oxygen concentration detection cell 13 as a result of the flow of the constant current −Iconst to the oxygen concentration detection cell 13. At the point in time when the second detection time previously set to be longer than the first detection time elapses after the supply of the constant current −Iconst has been started, the sensor control apparatus 1 detects the second difference voltage ΔVs2 which is generated in the oxygen concentration detection cell 13 as a result of the flow of the constant current −Iconst to the oxygen concentration detection cell 13.

As described above, the sensor control apparatus 1 detects the first difference voltage ΔVs1 and the second difference voltage ΔVs2 when the two judgment conditions of S955 and S975 are satisfied (S955: YES and S975: YES), because the concentration of oxygen contained in the measurement chamber 28 can be judged to have become high. As a result, the sensor control apparatus 1 can detect the first cell voltage and the second cell voltage under an atmosphere in which the concentration of oxygen contained in the measurement chamber 28 is high. Thus, the accuracy in detecting deterioration of the gas sensor 3 can be enhanced.

In the fourth embodiment described above, S910 to S930 of the concentration detection process corresponds to the process as the target voltage setting section, and S955 and S975 correspond to the processes as the two condition judgment sections. Notably, in the fourth embodiment, the process as the condition judgment section uses two judgment conditions of S955 and S75 so as to stably enhance the accuracy in detecting deterioration of the gas sensor 3. However, only S955 may be used in the process as the condition judgment section by omitting the processes of S965 and S975 from the impedance detection process of FIG. 17, because when deterioration of the gas sensor 3 is detected under the atmosphere in which the concentration of oxygen contained in the measurement chamber 28 is high, the effect of enhancing the deterioration detection accuracy is expected.

Fifth Embodiment

A fifth embodiment of the present disclosure will now be described with reference to the drawings. Notably, in the fifth embodiment, portions different from those of the third embodiment will be described. Common constituent elements are denoted by the same reference numerals. A sensor control apparatus 1 of the fifth embodiment differs from that of the third embodiment in the point that the sensor control apparatus 1 of the fifth embodiment executes a changed impedance detection process.

The impedance detection process of the fifth embodiment differs from that of the third embodiment in the point that the processes of S1010 to S1050 are added between the processes of S70 and S80 of the third embodiment. In the third embodiment, the microcomputer 43 obtains the first difference voltage ΔVs1 at the point in time when the first detection time elapses after the supply of the constant current −Iconst to the oxygen concentration detection cell 13 has been started, continues the supply of the constant current −Iconst after that, and obtains the second difference voltage ΔVs2 at the point in time when the second detection time elapses. However, in the fifth embodiment, the supply of the constant current −Iconst for obtaining the first difference voltage ΔVs1 and the supply of the constant current −Iconst for obtaining the second difference voltage ΔVs2 are performed separately.

Figure 18:
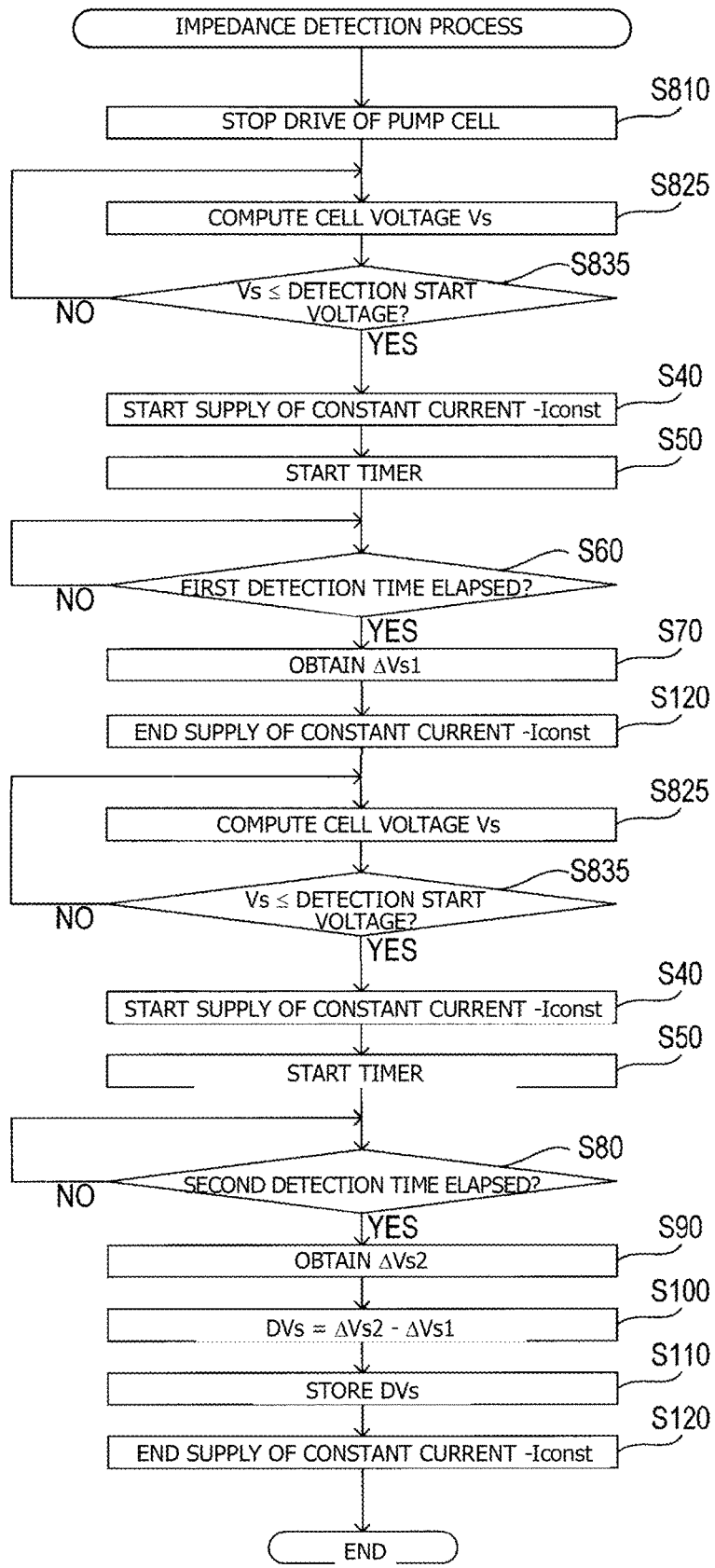
FIG. 18 is a flowchart showing an impedance detection process of a fifth embodiment.

When the impedance detection process of the fifth embodiment is executed, as shown in FIG. 18, the microcomputer 43 executes the processes of S810 to S70 which are the same as those in the first embodiment. After ending the process of S70, the microcomputer 43 proceeds to S1010 so as to end the supply of the constant current −Iconst. Subsequently, the microcomputer 43 proceeds to S1020 so as to compute the cell voltage Vs as in S825, and judges in S1030 whether or not the cell voltage Vs computed in S1020 is equal to or lower than a previously set detection start voltage (in the present embodiment, for example, 0.1 V). In the case where the cell voltage Vs is equal to or lower than the detection start voltage, the microcomputer 43 repeats the process of S1030. Meanwhile, in the case where the cell voltage Vs is higher than the detection start voltage, the microcomputer 43 proceeds to S1040 so as to again start the supply of the constant current −Iconst. The microcomputer 43 then proceeds to S1050 so as to reset and start the timer provided in the RAM. Since the first difference voltage ΔVs1 has been obtained in S70, after completion of the process of S1050, the microcomputer 43 proceeds to S80 and successively executes the processes of S80 to S120 which are the same as those in the third embodiment, and ends the impedance detection process.

One embodiment of the present disclosure has been described above, but the present disclosure is not limited to the above embodiment and can be embodied in various other forms.

For example, in the above-described embodiments, the gas sensor is an oxygen sensor. However, the gas sensor may be a gas sensor which detects a gas (for example, NOx or the like) other than oxygen. For example, the present invention may be applied to an NOx sensor which includes a second measurement chamber communicating with the measurement chamber provided between the pump cell and the oxygen concentration detection cell, and a second pump cell having a pair of electrodes provided inside and outside the second measurement chamber. In this NOx sensor, the oxygen concentration within the measurement chamber is adjusted to a predetermined concentration by the pump cell 11, and a gas having an adjusted oxygen concentration is introduced into the second measurement chamber. As a result of application of a predetermined voltage between the pair of electrodes of the second pump cell, NOx contained in the gas introduced into the second measurement chamber dissociates, and a current flows through the second pump cell in accordance with oxygen produced as a result of the dissociation. Since the current flowing through the second pump cell has a correlation with the concentration of NOx, NOx contained in the gas under measurement can be detected. Even in the case of such an NOx sensor, the accuracy in detecting deterioration of the NOx sensor can be enhanced by employing the first cell voltage and the second cell voltage obtained through the oxygen concentration detection cell, as described above, upon judgment that the previously set deterioration detection condition indicating that the concentration of oxygen contained in the measurement chamber disposed between the pump cell and the oxygen concentration detection cell is high is satisfied.

Also, the structure of the sensor element 10 which has been described in the embodiments and includes the pump cell 11 and the oxygen concentration detection cell 13 is not limited to the structure employed in the embodiments. For example, the structure of the sensor element 10 may be modified by omitting the configuration for supplying the constant small current Icp to the oxygen concentration detection cell 13 and by employing a configuration in which a reference gas chamber serving as a flow passage for introducing the air into the sensor element 10 itself is provided such that the detection electrode 27 of the oxygen concentration detection cell 13 is exposed to a reference gas atmosphere (for example, the air) without being exposed to the exhaust gas, whereby a voltage corresponding to an oxygen partial pressure difference is generated between the detection electrodes 26 and 27.

Furthermore, in the above-described embodiments, the deterioration determination voltage Dvs is stored, and the stored deterioration determination voltage Dvs is used so as to perform the deterioration determination process, etc. However, the embodiments may be modified to convert the deterioration determination voltage Dvs to an impedance value and store the impedance value for use. In such a case, the deterioration determination value TH1 used in S220 of the deterioration determination process and the target difference voltage ΔVstg corrected in S420 of the target correction process are appropriately set as values corresponding to the impedance.

Also, the function of one constituent element in the above embodiments may be distributed to a plurality of constituent elements, or the functions of a plurality of constituent elements may be realized by one constituent element. Part of the configurations of the above embodiments may be omitted. Also, at least part of the configuration of each of the above embodiments may be added to or partially replace the configurations of other embodiments. Notably, all modes included in the technical idea specified by the wording of the claims are embodiments of the present disclosure.

The present disclosure may be realized in various forms other than the above-described sensor control apparatus 1. For example, the present disclosure may be realized as a system including the sensor control apparatus 1 as a constituent element, a program for causing a computer to function as the sensor control apparatus 1, a medium on which the program is recorded, and a sensor control method.

DESCRIPTION OF REFERENCE NUMERALS

1 . . . sensor control apparatus; 3 . . . gas sensor; 11 . . . pump cell; 13 . . . oxygen concentration detection cell; 21 . . . oxygen-ion-conductive solid electrolyte body; 22, 23 . . . pump electrode; 25 . . . oxygen-ion-conductive solid electrolyte body; 26, 27 . . . detection electrode; 28 . . . measurement chamber; 29 . . . reference oxygen chamber; 43 . . . microcomputer

The invention claimed is:

1. A sensor control apparatus connected to a gas sensor, wherein the gas sensor includes:
   a measurement chamber into which target gas is introduced;
   an oxygen concentration detection cell having a first solid electrolyte body and a pair of first electrodes which are formed on the first solid electrolyte body, one of which is disposed to face the measurement chamber, and the other of which is disposed in a reference gas chamber set to a reference gas atmosphere, and generating a voltage corresponding to a difference in an oxygen partial pressure between the measurement chamber and the reference gas chamber;
   a pump cell having a second solid electrolyte body and a pair of second electrodes which are formed on the second solid electrolyte body and one of which is disposed to face the measurement chamber, and pumping out oxygen contained in the target gas introduced into the measurement chamber or pumping oxygen into the measurement chamber in accordance with pump current flowing between the pair of second electrodes, and
   wherein the sensor control apparatus is configured to control supply of the pump current flowing to the pump cell such that the voltage produced in the oxygen concentration detection cell becomes equal to a first target voltage set as a control target voltage, and the sensor control apparatus comprises:

a CPU, wherein the CPU is configured to judge whether or not a deterioration detection condition is satisfied, said deterioration detection condition being previously set and indicating that the concentration of oxygen contained in the measurement chamber is high;

the CPU is configured to supply deterioration detection current having a previously set constant current value to the oxygen concentration detection cell when the CPU judges that the deterioration detection condition is satisfied;

the CPU is configured to detect a first cell voltage which is generated in the oxygen concentration detection cell as a result of the deterioration detection current flowing to the oxygen concentration detection cell after a predetermined first detection time following the supply of the deterioration detection current by the CPU to the oxygen concentration detection cell; and the CPU is configured to detect a second cell voltage which is generated in the oxygen concentration detection cell as a result of the deterioration detection current flowing to the oxygen concentration detection cell after a predetermined second detection time, which is longer than the first detection time, following the supply of the deterioration detection current by the CPU to the oxygen concentration detection cell.

2. The sensor control apparatus according to claim 1, wherein the CPU judges the deterioration detection condition based on when the concentration of oxygen contained in the measurement chamber is greater than a previously set detection start determination value.

3. The sensor control apparatus according to claim 1, wherein the CPU is further configured to stop the pumping out or pumping in of oxygen by the pump cell upon stoppage of an engine of a vehicle on which the sensor control apparatus is mounted, and wherein the CPU judges the deterioration detection condition based on when a previously set detection start time elapses after the engine stops.

4. The sensor control apparatus according to claim 1, wherein the CPU is further configured to stop the pumping out or pumping in of oxygen by the pump cell upon stoppage of an engine of a vehicle on which the sensor control apparatus is mounted, and wherein the CPU judges the deterioration detection condition based on when the engine of the vehicle on which the sensor control apparatus is mounted stops and the voltage generated in the oxygen concentration detection cell is equal to or lower than a previously set detection start voltage.

5. The sensor control apparatus according to claim 1, wherein the CPU is further configured to set the control target voltage to the first target voltage during a period during which the concentration of a particular gas component is detected by the gas sensor and sets the control target voltage to a second target voltage whose voltage value is different from that of the first target voltage during a period during which deterioration of the gas sensor is detected, wherein the second target voltage is a voltage value for controlling the supply of the pump current such that the concentration of oxygen contained in the measurement chamber becomes higher than that in the case where the supply of the pump current is controlled such that the voltage generated in the oxygen concentration detection cell becomes equal to the first target voltage, and wherein-the CPU judges the deterioration detection condition based on when the control target voltage is switched from the first target voltage to the second target voltage by the CPU.

6. The sensor control apparatus according to claim 5, wherein the CPU judges the deterioration detection condition is that based on when the control target voltage is switched from the first target voltage to the second target voltage by the CPU and a previously set stabilization time elapses after the control target voltage has been set to the second voltage.

7. The sensor control apparatus according to claim 1, wherein the CPU is configured to judge whether or not the gas sensor has deteriorated on the basis of a deterioration determination voltage obtained by subtracting the first cell voltage from the second cell voltage.

8. The sensor control apparatus according to claim 1, wherein the CPU is configured to correct the current value of the pump current on the basis of the first cell voltage and the second cell voltage.

9. The sensor control apparatus according to claim 1, wherein the CPU is configured to supply impedance detection current having a previously set constant current value to the oxygen concentration detection cell;

the CPU is configured to detect a third cell voltage generated in the oxygen concentration detection cell as a result of the impedance detection current flowing to the oxygen concentration detection after a predetermined third detection time following the supply of the impedance detection current by the CPU to the oxygen concentration detection cell;

the CPU is configured to control energization of a heater for heating the oxygen concentration detection cell and the pump cell through use of the third cell voltage detected by the CPU; and the CPU is configured to correct the control of the energization of the heater on the basis of the first cell voltage and the second cell voltage.

10. The sensor control apparatus according to claim 9, wherein the CPU is configured to correct the control of the energization of the heater by correcting a target value of a controlled variable for controlling the heater based on the first cell voltage and the second cell voltage.

* * * * *